(12) United States Patent
Kanj et al.

(10) Patent No.: US 9,461,359 B2
(45) Date of Patent: Oct. 4, 2016

(54) MOBILE DEVICE ANTENNA

(75) Inventors: Houssam Kanj, Waterloo (CA); Huanhuan Gu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 26 days.

(21) Appl. No.: 14/239,459

(22) PCT Filed: Aug. 19, 2011

(86) PCT No.: PCT/CA2011/050508
§ 371 (c)(1),
(2), (4) Date: Jun. 13, 2014

(87) PCT Pub. No.: WO2013/026130
PCT Pub. Date: Feb. 28, 2013

(65) Prior Publication Data
US 2014/0329473 A1    Nov. 6, 2014

(51) Int. Cl.
| | | |
|---|---|---|
| *H01Q 1/50* | (2006.01) | |
| *H01Q 1/24* | (2006.01) | |
| *H01Q 9/42* | (2006.01) | |
| *H01Q 1/22* | (2006.01) | |
| *H01Q 9/04* | (2006.01) | |
| *H04B 1/40* | (2015.01) | |
| *H01Q 5/357* | (2015.01) | |
| *H01Q 5/371* | (2015.01) | |

(52) U.S. Cl.
CPC .............. *H01Q 1/50* (2013.01); *H01Q 1/2275* (2013.01); *H01Q 1/243* (2013.01); *H01Q 5/357* (2015.01); *H01Q 5/371* (2015.01); *H01Q 9/0421* (2013.01); *H01Q 9/42* (2013.01); *H04B 1/40* (2013.01)

(58) Field of Classification Search
CPC ........................................................ H01Q 1/50
USPC ............ 455/73; 343/700 MS, 702, 845, 846, 343/906
See application file for complete search history.

(56) References Cited

U.S. PATENT DOCUMENTS

| | | | |
|---|---|---|---|
| 7,830,320 B2 | 11/2010 | Shamblin et al. | |
| 7,916,087 B2 * | 3/2011 | Wen et al. ............. | 343/700 MS |
| 8,248,312 B2 * | 8/2012 | Guan et al. ................... | 343/702 |
| 8,970,436 B2 * | 3/2015 | Yang ............................. | 343/702 |
| 2004/0090377 A1 | 5/2004 | Dai et al. | |
| 2006/0181466 A1 | 8/2006 | Krupa | |
| 2008/0055164 A1 | 3/2008 | Zhang et al. | |

(Continued)

FOREIGN PATENT DOCUMENTS

| | | |
|---|---|---|
| EP | 1387435 | 2/2004 |
| EP | 1703586 | 9/2006 |

OTHER PUBLICATIONS

International Search Report and Written Opinion of the International Searching Authority issued in International Application No. PCT/CA2011/050508 on May 16, 2012; 8 pages.

(Continued)

*Primary Examiner* — Tuan H Nguyen
(74) *Attorney, Agent, or Firm* — Fish & Richardson P.C.

(57) ABSTRACT

In some aspects, an antenna system for a mobile device includes a multi-feed structure and a main antenna structure. The feeds reside on a substantially planar surface of a substrate. Each of the feeds has a first end connected to at least one of the other feeds and a second end connected to a connector. The main antenna structure extends from the substantially planar surface and is connected to the connector.

27 Claims, 22 Drawing Sheets

(56) References Cited

U.S. PATENT DOCUMENTS

| | | | |
|---|---|---|---|
| 2009/0058649 A1* | 3/2009 | Tuttle | H01Q 1/2225 340/572.1 |
| 2010/0127938 A1 | 5/2010 | Ali et al. | |
| 2010/0149063 A1 | 6/2010 | Chan et al. | |
| 2010/0214174 A1 | 8/2010 | Guan et al. | |
| 2011/0037654 A1* | 2/2011 | Chiu et al. | 343/700 MS |
| 2011/0043408 A1 | 2/2011 | Shi et al. | |
| 2011/0163922 A1 | 7/2011 | Wang et al. | |
| 2011/0193758 A1 | 8/2011 | Liu et al. | |

OTHER PUBLICATIONS

Microstrip Antenna, Wikipedia, obtained from the Internet: http://en.wikipedia.org/wiki/Microstrip_antenna, dated Feb. 24, 2011, 3 pages.

Extended European Search Report issued in European Application No. 11871140.7 on Nov. 21, 2014; 12 pages.

* cited by examiner

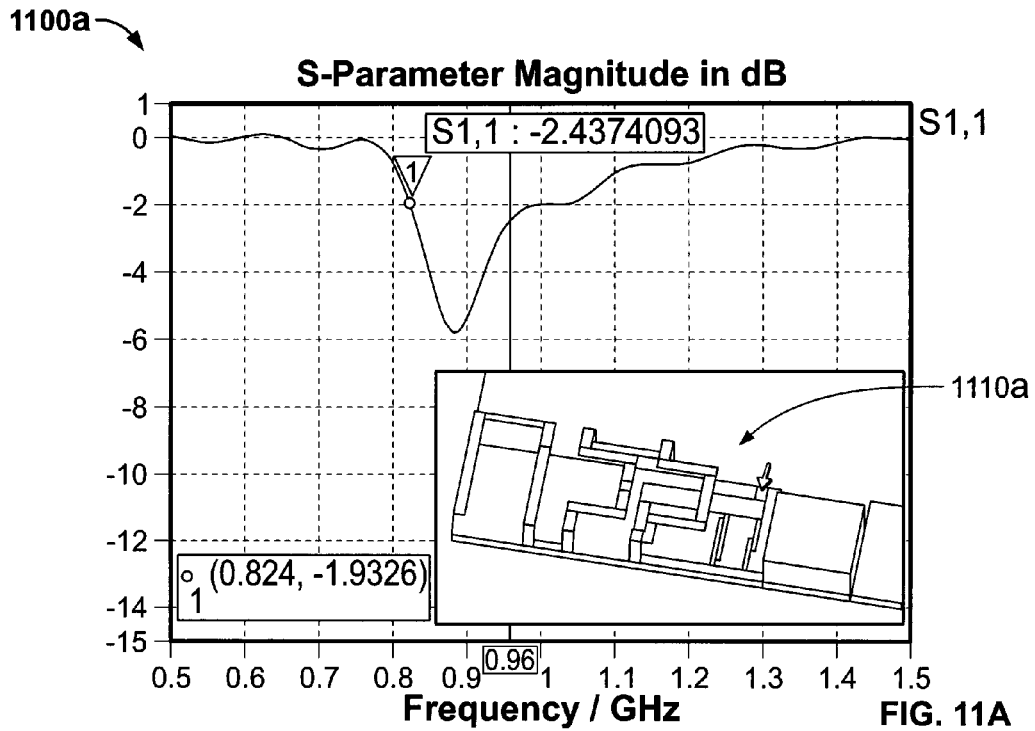

MOBILE DEVICE ANTENNA

CLAIM OF PRIORITY

This application is a U.S. National Stage of PCT/CA2011/050508 filed on Aug. 19, 2011, which is hereby incorporated by reference.

BACKGROUND

This specification relates to mobile device antennas.

Mobile devices often include one or more antennae. A mobile device can use its antennae to communicate wirelessly with external devices and systems. For example, some mobile devices can communicate with a wireless Local Area Network (WLAN), a Personal Area Network (PAN) (e.g., Bluetooth and others), a public land mobile network using cellular technology (e.g., Global System for Mobile Communication (GSM), Universal Mobile Telecommunication Services (UMTS), Long-Term Evolution (LTE), etc.), or another type of device or system.

In some mobile devices, the small size of the mobile device, as well as the locations of ports and other components of the mobile device, constrain the antenna design. For example, an antenna may need to accommodate a USB port at the bottom of the mobile device. Some mobile device antenna systems include stainless steel bands around the edge of the mobile device. For example, one of the stainless steel bands can be used for WiFi, Bluetooth, and GPS, while another one of the stainless steel bands can be used for cellular radio.

BRIEF DESCRIPTION OF THE DRAWINGS

FIGS. 11A, 11B, 11C, 11D, and 11E are diagrams showing simulated data for multiple example antenna systems.

Like reference numbers and designations in the various drawings indicate like elements.

DETAILED DESCRIPTION

Figure 1:
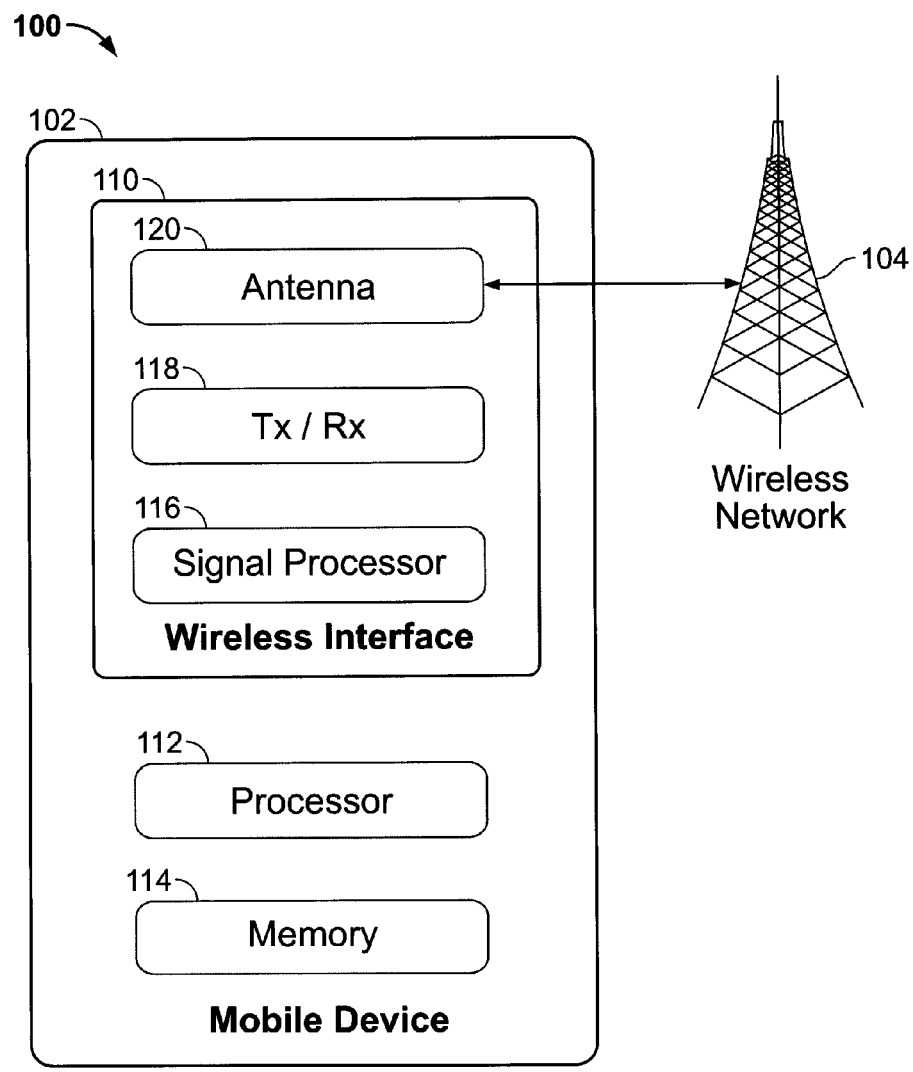
FIG. 1 is a schematic diagram of an example communication system.

In some implementations, a compact, low-profile antenna system can improve the aesthetic, design, performance, or other aspects of a mobile device. Some of the antenna systems described here can be used by a mobile device for communication with a wireless telecommunications network. In some implementations, the antenna systems can accommodate structural features of the mobile device. For example, the antenna structure and a USB port structure can be on the same side or the same end of the mobile device.

In some cases, a mobile device uses two antenna radiators to communicate with a wireless telecommunications network. For example, the mobile device can use one antennae to handle signals in a lower frequency range, and the mobile device can use another antenna to handle signals in a higher frequency range. In some instances, the mobile device uses both antennae to communicate with a single wireless telecommunications network by signals in both frequency ranges.

As a particular example, in some instances, the antenna system can include two radiators for communication on a GSM, UMTS, or LTE (Long Term Evolution) wireless network—one radiator for a low band frequency range from 824 to 960 MHz and another radiator for a high band frequency range from 1710 to 2170 MHz. The two radiators can reside at a bottom end of the mobile device and can be separated by a USB port structure that is also at the bottom end of the mobile device. In some implementations, the mobile device has a form factor of approximately 108 mm×60 mm×8 mm, an antenna height of approximately 3.2 mm, a printed circuit board thickness of approximately 0.8 mm, and a ground clearance of approximately 10 mm.

In some implementations, the antenna system includes one or more multi-band antennae covering the 824-960 MHz and the 1710-2170 MHz bands. In some aspects, the efficiency of the antenna system can be described by the S11 parameter of the antenna, which indicates the amount of power reflected by the antenna system at a given frequency. In some cases, the S11 parameter can be estimated by numerical simulations, or it can be measured, for example, using a network analyzer.

The measured antenna efficiency (without the match) peaks to 75% (−1.25 dB) in the center of the 824-960 MHz band and drops to 30% (−5.2 dB) at the band edges. With matching, the handmade antenna prototype has an efficiency better than −3.9 dB. A better performance is expected using high Q matching components and professional manufacturing.

In some implementations, one or more of the antenna systems described here can be tuned easily. For example, the antenna systems can be tuned by modifying the meandering or winding of a main antenna structure, by modifying parasitic coupling of a multi-feed structure, or making other modifications. For example, the antenna system can include a multi-feed structure, which may improve the bandwidth of the antenna system in some cases, and the multi-feed structure can be tuned by adjusting its position, shape and size. In some cases, coupling to ground can be adjusted to shift the antenna resonance up or down.

FIG. 1 is a schematic diagram of an example communication system 100. The example communication system 100 includes a mobile device 102 and a wireless network 104. The communication system 100 can include additional or other features and components. For example, the communication system 100 can include one or more servers, computing systems, additional or other networks, wireless terminals, or any suitable combination of these other components. The components of the communication system 100 can be configured as shown in FIG. 1, or the communication system 100 can be configured in another manner, as appropriate.

The example wireless network 104 shown in FIG. 1 can include one or more wireless telecommunication networks, wireless data networks, combined voice and data networks, or any suitable combination of these and other types of wireless networks. The wireless network 104 can communicate with the mobile device 102, for example, by radio frequency signals or another mode of communication. The wireless network 104 can include one or more local, regional, national, and/or global networks. The wireless network 104 can include one or more cellular networks. For example, a cellular network can include one or more base stations, radio antennas, and other subsystems and infrastructure. The wireless network 104 may utilize one or more communication protocol standards, for example, 3G, 4G, GSM, LTE, CDMA, GPRS, EDGE, LTE, or others.

Figure 2:
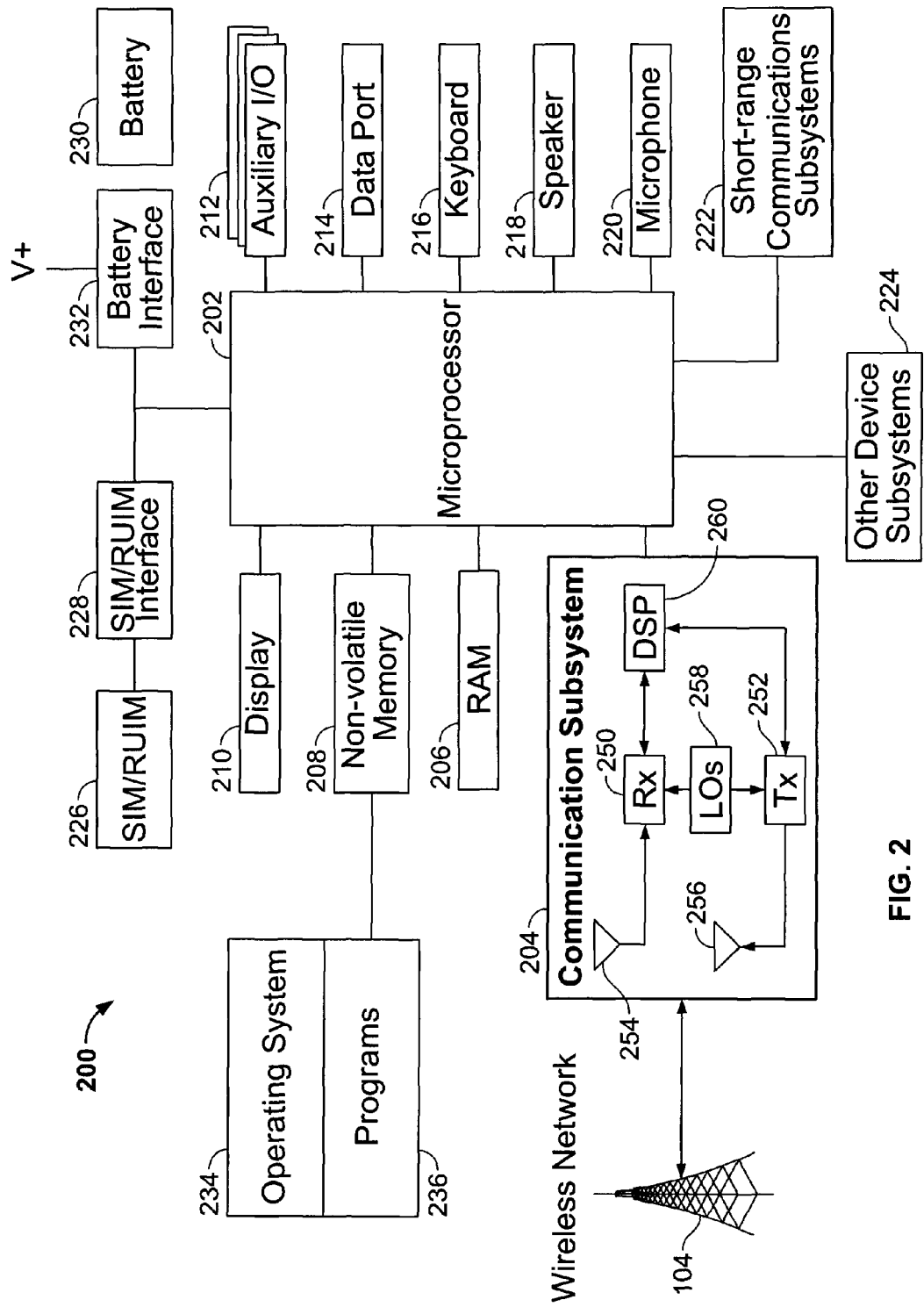
FIG. 2 is a schematic diagram of an example wireless terminal.

The mobile device 102 includes a wireless interface 110, a processor 112, and a memory 114. The mobile device 102 can include additional or other features. In some instances, the mobile device 102 includes one or more user interfaces. For example, a user interface can include a touchscreen, a keyboard, a microphone, a pointing device (e.g., a mouse, a trackball, a stylus, etc.), or another type of user interface. The features and components of the mobile device 102 can be configured as shown and described with respect to FIG. 1 or in a different manner. Generally, the mobile device 102 can include any appropriate types of subsystems, modules, devices, components, and combinations thereof. Examples of mobile devices include various types of mobile telecommunication devices, electronic readers, media players, smartphones, laptop systems, tablet devices, etc. The wireless terminal 200 shown in FIG. 2 is an example of a mobile device.

In some implementations, the mobile device 102 includes one or more ports configured to couple with an external device. For example, the mobile device 102 can include a Universal Serial Bus (USB) port, an audio port, a data port, a power port, or any suitable combination of these and other types of ports. A port can include a coupling structure (e.g., a slot) configured to receive, or to be received by, a connector or another type of mated component of another device. A port can include any suitable electrical contacts, mechanical contacts, or both. A port can include additional or other features or components.

The wireless interface 110 of the mobile device 102 can include any suitable hardware, software, firmware, or combinations thereof. The wireless interface 110 includes a signal processor 116, a transmitter/receiver 118, and an antenna 120. The wireless interface 110 may include additional or other features or components. In some implementations, the wireless interface 110 may include or have access to programs, codes, scripts, functions, or other types of instructions that can be executed by data processing apparatus. In some implementations, the wireless interface 110 may include or have access to pre-programmed or re-programmable logic circuits, logic gates, or other types of hardware or firmware components. The wireless interface 110 handles wireless communications between the mobile device 102 and the wireless network 104. The mobile device 102 can include additional wireless interfaces for communicating with other types of wireless systems. For example, the mobile device 102 can include one or more additional wireless interfaces for short-range wireless communications.

The signal processor 116 can include any suitable hardware, software, firmware, or combinations thereof configured to control operation of the transmitter/receiver 118. The signal processor 116 can control operation of the transmitter/receiver 118 based on information received from the processor 112 or based on other information. The transmitter/receiver 118 can include a transmitter component, a receiver component, a transceiver component, or any suitable combination of these and other components.

In some aspects of operation, the transmitter/receiver 118 can generate radio frequency signals based on the control operations applied by the signal processor 116. The transmitter/receiver 118 can transfer the radio frequency signals to the antenna 120 for wireless transmission to the wireless network 104. In some aspects of operation, the antenna 120 can wirelessly receive radio frequency signals from the wireless network 104 and transfer the radio frequency signals to the transmitter/receiver 118. The transmitter/receiver 118 can provide information to the signal processor 116 based on the received radio frequency signals.

The antenna 120 can include a single antenna or multiple antennae. The antenna 120 can include any suitable structures or components configured to radiate radio frequency signals. The radiated signals can be produced for wireless communication with the wireless network 104. For example, the antenna 120 can include any of the features or components of the antennae shown in FIG. 2, 3, 4, 6A, 7, 9A, 10A, 10B, 10C, 10D, 10E, 11A, 11B, 11C, 11D, 11E, 13A, or 14A, or the antenna 120 can additional or different features or components.

In some implementations, the antenna 120 includes a low band antenna component and a high band antenna component. The low band antenna component can be configured to communicate wireless signals in a lower frequency range (e.g., 824 MHz to 960 MHz, or another range), and the high band antenna component can be configured to communicate wireless signals in a higher frequency range (e.g., 1710 MHz to 2170 MHz, or another range). In some implementations, the low band antenna component and the high band antenna component can each have a dedicated transmitter/receiver and signal processor. In some implementations, the low band antenna component and the high band antenna component can share resources or components.

The processor 112 can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, the processor 112 can generate output data by executing or interpreting software, scripts, programs, functions, executables, or other modules stored in the memory 114.

The memory 114 can include any suitable computer-readable media. The memory 114 can include a volatile memory device, a non-volatile memory device, or both. The memory 114 can include one or more read-only memory devices, random-access memory devices, buffer memory devices, or a combination of these and other types of memory devices. In some instances, one or more components of the memory 114 can be integrated or otherwise associated with another component of the mobile device 102.

FIG. 2 is a schematic diagram of an example wireless terminal 200. For example, the wireless terminal 200 can be a BLACKBERRY® telecommunication device and/or another type of mobile telecommunication device. In some implementations, the wireless terminal 200 is a dual-mode device. The example wireless terminal 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a short-range communication subsystem 222, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The wireless terminal 200 can include the same, additional, or other features, which may be arranged or configured to operate in the manner shown or in another manner.

The example wireless terminal 200 is a battery-powered device that includes a battery interface 232 that receives direct current electrical power from one or more rechargeable batteries 230. The battery 230 can be a smart battery with an embedded microprocessor or another type of battery. The battery interface 232 may be coupled to a regulator (not shown), which may assist the battery 230 in providing power V+ to the wireless terminal 200. Additionally or alternatively, the wireless terminal 200 may receive power from an external source (e.g., an alternating current power source, an adapter, a converter, etc.) and/or another type of internal power source.

The example wireless terminal 200 shown in FIG. 2 can operate as a two-way communication device having voice and data communication capabilities. The wireless terminal 200 can communicate over a wireless network. For example, the wireless terminal 200 may communicate over the wireless network 104 shown in FIG. 1, or additional or other types of wireless networks. Thus, the wireless terminal 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. In some implementations, the wireless network utilize one or more communication protocol standards, for example, 3G, 4G, GSM, CDMA, GPRS, EDGE, LTE or others.

In the example wireless terminal 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The antennae 254 and 256 can be implemented as a single antenna structure or as multiple antenna structures. For example, antennae 254 and 256 can be implemented using of the features or components of the antennae shown in FIG. 2, 3, 4, 6A, 7, 9A, 10A, 10B, 10C, 10D, 10E, 10F, 11A, 11B, 11C, 11D, 11E 13A, or 14A, or the antenna 120 can additional or different features or components.

The communication subsystem 204 can be used to communicate with a network. The DSP 260 can be used to receive and send signals through the receiver 250 and the transmitter 252, respectively, and the DSP 260 can provide control information to the receiver 250 and the transmitter 252. For example, the gain levels applied to communication signals in the receiver 250 and the transmitter 252 can be adaptively controlled through automatic gain control algorithms implemented in the DSP 260. Additional and/or other types of control algorithms may be implemented in the DSP 260 to provide more sophisticated control of the communication subsystem 204.

In some implementations, the local oscillator 258 includes a single local oscillator that provides a reference signal for the receiver 250 and the transmitter 252, for example, where voice and data communications occur at a single frequency, or closely-spaced sets of frequencies. In some cases, for example if other frequencies are utilized for voice communications and data communications, the local oscillator 258 may include multiple local oscillators that are used to generate multiple other frequencies corresponding to the voice and data networks. Information, which may include both digital voice and digital data information, can be communicated within the wireless terminal 200 to and from the communication subsystem 204 through a link or bus between the DSP 260 and the microprocessor 202. The design and configuration of the communication subsystem 204, such as frequency band, component selection, power level, etc., may depend on the communication network in which the wireless terminal 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the wireless terminal 200 may send and receive communication signals, including both voice and data signals, over the wireless network 104. Signals received by the antenna 254 from the communication network can be routed to the receiver 250, which can provide signal amplification, frequency down conversion, filtering, channel selection, etc., and may also provide analog to digital signal conversion. Analog to digital conversion of the received signal may allow the resulting digital signal to be decoded by the DSP 260. Signals to be transmitted to the network can be processed (e.g., modulated, encoded, etc.) by the DSP 260 and then provided to the transmitter 252 for digital to analog conversion, frequency up conversion, filtering, amplification and transmission to the communication network via the antenna 256.

In some implementations, the wireless terminal 200 can send and receive communication signals over the wireless network 104 after wireless network registration or activation procedures have been completed. The wireless network registration or activation procedures for the wireless terminal 200 may vary based on the type of network or networks with which the wireless terminal 200 operates. Wireless network access for the example wireless terminal 200 shown in FIG. 2 can be associated with a subscriber or user of the wireless terminal 200. In particular, the SIM/RUIM card 226 in the SIM/RUIM interface 228 may identify the subscriber or user of the wireless terminal 200. The SIM/RUIM card 226 in the SIM/RUIM interface 228 may enable access to subscribed services through the wireless network 104. For example, subscribed services may include web browsing, e-mail, voice mail, Short Message Service (SMS), Multimedia Messaging Services (MMS), and/or others. The SIM/RUIM card 226 in the SIM/RUIM interface 228 can communicate with the microprocessor 202 on the wireless terminal 200. To identify the subscriber, the SIM/RUIM card 226 may include user parameters, such as an International Mobile Subscriber Identity (IMSI) and/or another type of subscriber identifier. The SIM/RUIM card 226 may store additional and/or other subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the wireless terminal 200. The wireless terminal 200 may be manually synchronized with a host system, for example, by connecting the wireless terminal 200 through the data port 214 (e.g., in an interface cradle and/or another type of wired connection) that couples the wireless terminal 200 to a data port of a computer system or other device. The data port 214 may also be used to enable a user to set preferences through an external device or software application, or to download other programs for installation. The wired connection of the data port 214 may be used to load an encryption key onto the device.

The short-range communications subsystem 222 can provide communication between the wireless terminal 200 and other systems or devices, without the use of the wireless network 104. For example, the short-range communications subsystem 222 can include any suitable radio frequency devices and associated circuits and components for short-range communication. The wireless terminal 200 can include a Bluetooth subsystem, an NFC subsystem, an infrared communication subsystem, a WiFi communication subsystem, another type of short-range communication subsystem, or any suitable combination. In some implementations, the short-range communication subsystem 222 can be configured according to one or more standards or other types of specifications. Examples of short-range communication standards include standards developed by the Infrared Data Association (IrDA), BLUETOOTH®, the 802.11 family of standards developed by IEEE, the NFC Forum, and others.

The example microprocessor 202 can manage and control the overall operation of the wireless terminal 200. Many types of microprocessors or microcontrollers may be used, as appropriate. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 can interact with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the short-range communication subsystem 222, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the wireless terminal 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the wireless terminal 200 may include user application data, text files, image files, voicemail data, and other data generated by the user at the wireless terminal 200 or received and stored by the wireless terminal 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the wireless terminal 200 by the user.

The operating system 234 can control low-level functions of the wireless terminal 200 and facilitate operation of the programs 236. For example, the operating system 234 may provide an interface between one or more of the programs 236 and one or more hardware components on the wireless terminal 200. The programs 236 include computer program modules that can be executed by the microprocessor 202 (and/or the DSP 260 in some instances). In some implementations, one or more of the programs 236 are executed by the microprocessor 202 and provide a high-level interface between a user and the wireless terminal 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or other modules, programs, or applications, such as, for example, a Personal Information Manager (PIM) module, a connect module, a device state module, an IT policy module, a multi service platform manager, and/or others. The programs 236 may include programs that control basic device operations, which may be installed on the wireless terminal 200 during its manufacture and/or initial configuration. Other types of software applications, such as, for example, third party applications and/or other types of modules, may be added after the manufacture and initial configuration of the wireless terminal 200. Examples of third party applications include games, utilities, internet applications, etc. Generally, any of the programs 236 may be updated and/or modified at any time. The additional applications and/or updates to applications can be loaded onto the wireless terminal 200 through the wireless network 104, the auxiliary I/O devices 212, the data port 214, the short-range communication subsystem 222, or any other suitable device subsystem 224. The non-volatile memory 208 may also store keys, which may include encryption and decryption keys and addressing information for use in communicating between the wireless terminal 200 and servers.

Figure 3:
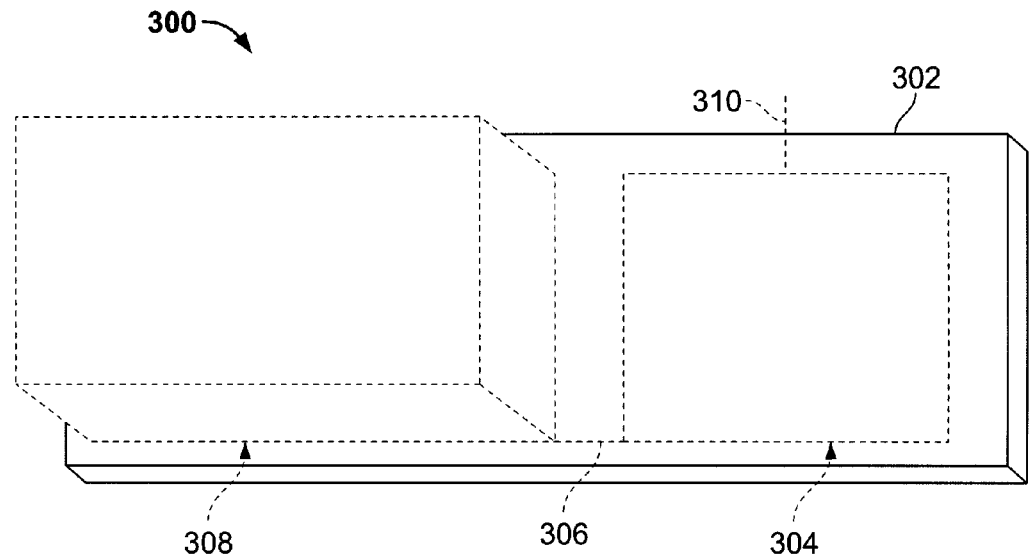
FIG. 3 is a schematic diagram of an example antenna system.

FIG. 3 is a schematic diagram of an example antenna system 300. The example antenna system 300 includes a radiator structure. The radiator structure includes a feed structure 304 and a main antenna structure 308. The feed structure 304 and the main antenna structure 308 are supported on a planar surface of a substrate 302. The feed structure 304 is connected to a main antenna structure 308 by a connector 306, and the feed structure 304 is connected to an input lead 310. The example antenna system 300 can include additional or different features.

The example antenna system 300 can be installed in a mobile device or another type of product. In cases where the antenna system 300 is a component of a mobile device, the mobile device can use the antenna system 300 to wirelessly communicate with external systems. In some instances, a transmitter or another component of the mobile device sends an "outgoing" signal to the antenna system 300, and the antenna system 300 wirelessly transmits the outgoing signal. In some instances, the antenna system 300 wirelessly receives an "incoming" signal from an external source, and the antenna system 300 sends the incoming signal to a receiver or another component of the mobile device. In some cases, the antenna system 300 is configured to receive and transmit wireless signals in a given frequency range.

The substrate 302 includes a planar surface that supports the feed structure 304 and the main antenna structure 308. The substrate 302 can be made of a rigid insulator material. For example, the substrate 302 can be made of a plastic material, a printed circuit board, or another type of insulator material. In some implementations, the substrate 302 is larger than the region that supports the feed structure 304 and the main antenna structure 308. For example, the substrate 302 can be integral with or mechanically coupled to other parts of the mobile device, and the substrate 302 can include other regions that support or abut other components of the mobile device. The substrate 302 can be separate from other components of the mobile device. For example, the substrate 302 can be configured to support only the antenna components.

The input lead 310 can be a conductive wire, strip, contact, or other suitable structure. The input lead 310 is configured to be coupled with a transceiver, a transmitter, a receiver, or another component of a mobile device. For example, in cases where the antenna system 300 is a component of a mobile device, the input lead 310 can be connected to a transmitter/receiver component of the mobile device.

In the example shown in FIG. 3, the feed structure 304 is a conductive component that transfers signals between the input lead 310 and the main antenna structure 308. For example, the feed structure 304 can receive outgoing radio frequency signals from the input lead 310 and provide the outgoing radio frequency signals to the main antenna structure 308 through the connector 306; the feed structure 304 can receive incoming radio frequency signals from the main antenna structure 308 through the connector 306 and provide the incoming radio frequency signals to the input lead 310.

The feed structure 304 can include a multi-feed structure. For example, the feed structure 304 can include multiple feeds, where each of the feeds is connected to the other leads at one end and connected to the connector 306 at another end. Each of the feeds can include one or more sections of a conductive strip, a conductive wire, or any other suitable structure. The multi-feed structure can include multiple identical feeds and/or it can include multiple different types of feeds. For example, the multi-feed structure can include feeds of the same length, feeds of different lengths, feeds having the same geometry, feeds having different geometries, etc. The multi-feed structure 304 can include additional components. For example, the multi-feed structure can include one or more parasitic components or a lumped element component.

The feed structure 304 can be a substantially planar structure. For example, the conductors of the feed structure 304 can define a two-dimensional geometry on the surface of the substrate 302, and the conductors of the feed structure 304 can have a substantially uniform thickness over the two-dimensional geometry. The feed structure 304 can be formed on the substrate 302. For example, the feed structure 304 can be formed by a deposition process, a printing process, or any other suitable process. The feed structure 304 can be formed apart from the substrate 302 and then fastened to the substrate 302. For example, the feed structure 304 can be glued, bonded, potted, or otherwise adhered to the substrate.

The connector 306 can be a conductor or other structure that provides an electrical connection between the main antenna structure 308 and the multi-feed structure 304. For example, the connector 306 can be a conductive wire, strip, contact, or other suitable structure. In some implementations, the connector 306 is connected to multiple feeds of the multi-feed structure 304. For example, the connector 306 can be connected to all of the feeds. In some implementations, the connector 306 is connected to a primary conductor of the main antenna structure 308.

The main antenna structure 308 includes a conductive component. In some cases, the main antenna structure 308 includes a conductive wire, strip, or other structure that extends from the surface of the substrate 302. For example, the conductor of the main antenna structure 308 can be connected to the connector 306 on the surface of the substrate 302 and extend away from the surface of the substrate 302. In some cases, the conductor of the main antenna structure 308 extends from the surface of the substrate 302 in a direction that is substantially perpendicular to the surface of the substrate 302. In some cases, the conductor of the main antenna structure 308 extends from the surface of the substrate 302 in a direction that is angled with respect to the surface of the substrate 302.

The main antenna structure 308 can include a carrier component that supports the conductive component. For example, the carrier can be a solid plastic component, and the conductive component can be wrapped, formed, wound, or otherwise positioned about the carrier. In some cases, the conductive component defines a tortuous or meandering path about the surface of the carrier. The carrier can have any suitable geometric shape. For example, the carrier can be any suitable type of prism, cylinder, cone, or any other regular or irregular shape, as appropriate.

In some implementations, the conductive component of the main antenna structure 308 includes multiple sections. The conductive component can also include branching structures and other components. In some instances, some of the sections of the main antenna conductor are connected endto-end with other adjacent sections. Adjacent sections can be integral with each other, or adjacent sections can be bonded, soldered, or otherwise connected with each other. The sections can have any suitable geometric shape—they can be straight, curved, bent, tortuous, or otherwise. Adjacent sections can define any suitable angle (e.g., right, obtuse, acute, etc.) with respect to one another. Adjacent sections can meet at angled, curved, radiused, or other types of intersections. One or more of the sections can be coupled to another section, to a ground, or to another component of the antenna system 300. For example, one or more of the sections of the antenna structure can be capacitively coupled to ground. As another example, multiple sections can be conductively connected by a branching structure.

In some aspects of operation, the multi-feed structure 304 and the main antenna structure 308 receive a radio frequency signal through the input lead 310. The multi-feed structure 304 and the main antenna structure 308 can radiate an outgoing radio frequency signal based on the received input. In some aspects of operation, the multi-feed structure 304 and the main antenna structure 308 receive an incoming radio frequency signal through a surrounding medium. The multi-feed structure 304 and the main antenna structure 308 can provide an output signal through the input lead 310 to another component of the mobile device through the input lead 310.

Figure 4:
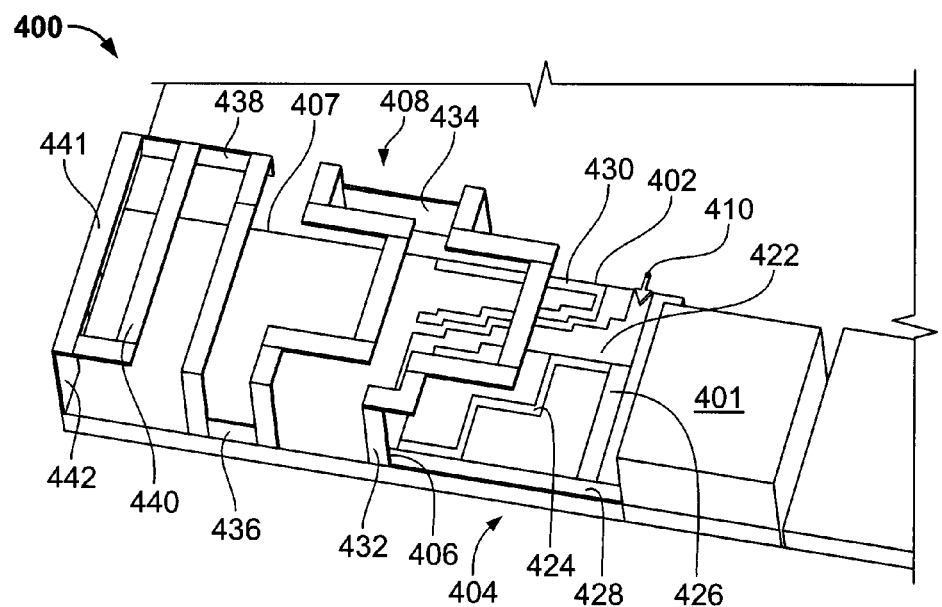
FIG. 4 is a schematic diagram of another example antenna system.

FIG. 4 is a schematic diagram of another example antenna system 400. The radiator portion of the antenna system 400 includes an on-board multi-feed structure 404 and an on-carrier main antenna structure 408. The multi-feed structure and the main antenna structure 408 are connected at a single connection point 406. In some cases, the use of a single connection point makes prototyping of the antenna structure easier to implement.

In some cases, the antenna system 400 can be used for wireless communications in a frequency range of 824 MHz to 960 MHz. The antenna system 400 can be implemented as a compact and low profile mobile device component, for example, with spatial dimensions of approximately 26.275 mm×11 mm×3.2 mm in some cases. The antenna system 400 includes a conductor that is meandered and/or folded in three-dimensions. The conductor is capacitively coupled to ground at two locations and includes a branching structure connected between two locations. The antenna system 400 uses parasitic coupling with the multi-feed structure 404. The antenna system 400 can also use patch loading at two different locations along the meandering portion.

The antenna system 400 is supported on a substrate 402 and is adjacent to a USB port structure 401. The antenna system 400 includes an exposed ground reference 407 along one edge of the substrate 402. The main antenna structure 408 and the multi-feed structure 404 are connected at a connection point 406. The multi-feed structure can be coupled to an input lead 410. The antenna system 400 can include additional or different features or components.

The multi-feed structure 404 defines a substantially two-dimensional structure that resides on a surface of the substrate 402. The example multi-feed structure 404 includes a parasitic component 430, a first feed 422, a second feed 424, a third feed 426, and a connector 428. The parasitic component 430, the first feed 422, the second feed 424, the third feed 426, and the connector 428 are all conductors. In some implementations, the parasitic component 430, the first feed 422, the second feed 424, the third feed 426, and the connector 428 reside on a substantially planar surface the substrate and have a thickness from the surface of the substrate 402. The components of the multi-feed structure 404 can all have substantially the same thickness, or the thickness can vary among locations of the multi-feed structure 404.

The first feed 422, the second feed 424, and the third feed 426 are all connected near the input lead 410. The first feed 422, the second feed 424, and the third feed 426 are also connected to the connector 428. The connector 428 is connected to a ground of the USB port structure 410, and the connector 428 is connected to a conductor of the main antenna structure 408 at the connection point 406.

The first feed 422 includes a first section near the input lead 410 and another section connected to the connector 428 at the connection point 406. The first section of the first feed 422 has a width that is tapered in a stepped (stair-cased) manner in one direction. In other words, the first section has a width that gets smaller in discrete increments, going from one end of the first section to the other end of the first section. Section 422 can additionally or alternatively be tapered in a continuous manner.

The parasitic component 430 provides capacitive coupling between the first feed 422 and ground 407. The parasitic component 430 includes a first section capacitively coupled to the first feed 422. The first section has a stepped profile that geometrically matches the stepped profile of the first feed 422. The parasitic component includes a second section capacitively coupled to ground 407 along the edge of the substrate 402. The second section has a straight profile that geometrically matches the straight edge of the substrate 402.

The second feed 424 includes multiple straight sections, and adjacent sections of the second feed 424 meet at right angles. A first end of the second feed 424 is connected to the first feed 422, and a second end of the second feed 424 is connected to the connector 428. The third feed 426 includes a single straight section. A first end of the third feed 426 is connected to the first feed 422, and a second end of the second feed 424 is connected to the connector 428. Accordingly, each of the feeds (the first feed 422, the second feed 424, and the third feed 426) has a different length and a different geometry than the other two feeds.

The main antenna structure 408 includes a conductor that extends from the substrate 402 and defines a path in three dimensions. In the example shown in FIG. 4, the conductor defines a tortuous path, which has multiple turns and meanders in three dimensions. The main antenna structure 408 can include a carrier structure (not shown) that supports the conductor. The conductor of the main antenna structure 408 includes multiple sections. Each section is a conductive strip that meets an adjacent section of the conductor. For example, a conductive strip can be bent at an angle to define two adjacent sections of the conductor, or a conductive strip can be soldered or otherwise joined to another conductive strip to define two adjacent sections of the conductor. In the example shown, the sections meet at right angles.

A section 432 of the main antenna structure 408 extends from the substrate 402 substantially perpendicular to the surface of the substrate 402. The section 432 is connected to the connector 428 at the connection point 406. Sections 434 and 438 of the main antenna structure 408 are capacitively coupled to the ground 407. The length of the section 434 and the distance between the section 434 and the ground 407 provide capacitive coupling between the section 434 and the ground 407. The length of the section 438 and the distance between the section 438 and the ground 407 provide capacitive coupling between the section 438 and the ground 407. Sections 436 and 442 of the main antenna structure 408 abut the substrate 402. One end of section 441 is connected to section 438, and the other end of section 441 is connected to section 442.

The main antenna structure 408 also includes a branching structure 440. The branching structure 440 includes a connector connecting two sections of the main antenna structure 408. In particular, the branching structure is connected to the section 438 and the section 441.

Figures 5A, 5B:
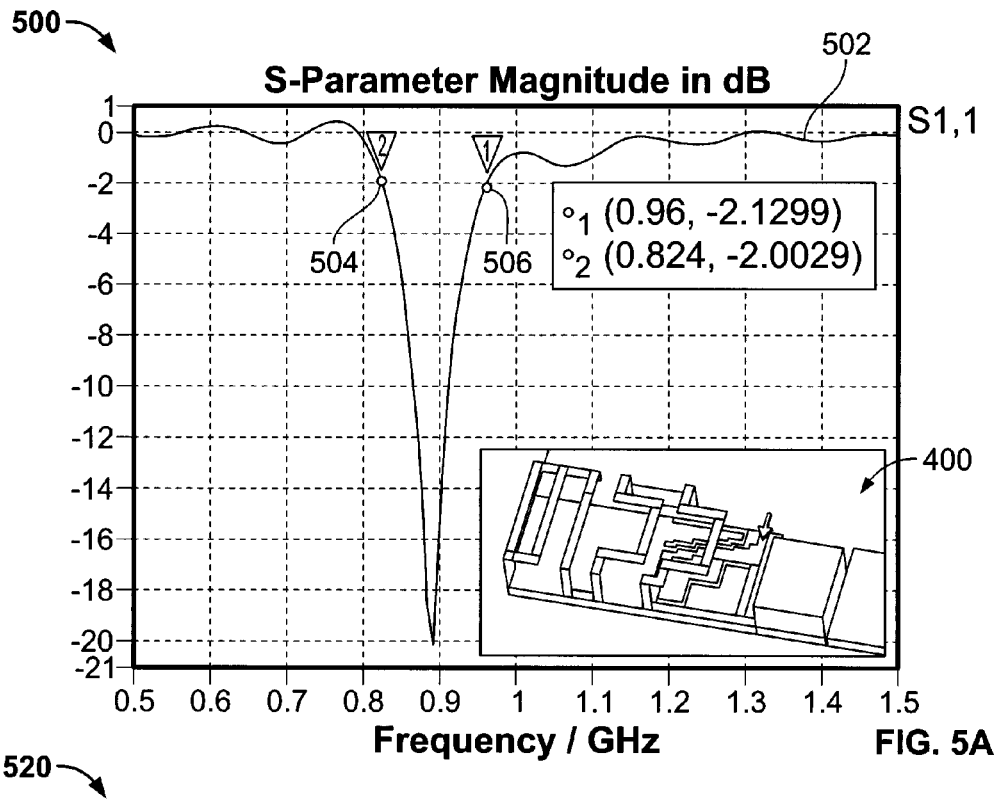
FIGS. 5A, 5B and 5C are diagrams showing simulated data for the example antenna system of FIG. 4.
Figure 5C:
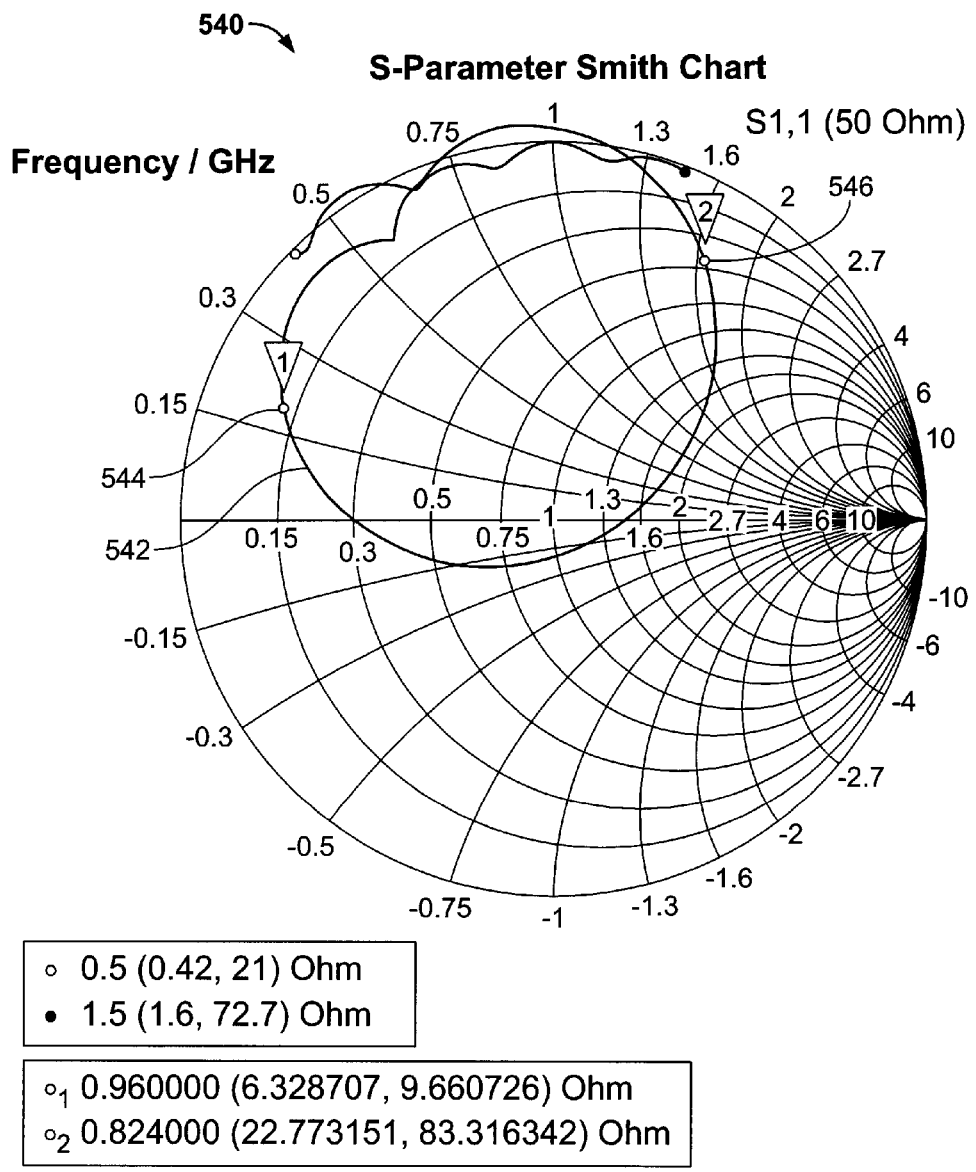

FIGS. 5A, 5B and 5C are diagrams showing simulated data for the example antenna system 400 of FIG. 4. The diagram 500 in FIG. 5A shows a plot 502 of the S11 parameter magnitude in dB units over a frequency range of 0.5 GHz to 1.5 GHz. The magnitude of the S11 parameter indicates the return loss of the antenna system radiator. the value of the S11 parameter has a negative peak between 824 and 960 MHz. The plot 502 is marked at two point 504 and 506, which indicate the magnitude of the S11 parameter at the lower and upper boundaries of the frequency range, 824 MHz and 960 MHz, respectively.

As shown in FIG. 5A, a first point 504 marked on the plot 502 indicates the S11 parameter has a value of −2.0 dB at 824 MHz (the lower end of the frequency range), and the second point 506 marked on the plot 502 indicates the S11 parameter has a value of −2.12 at 960 MHz (the upper end of the frequency range). The plot 502 shows that value of the S11 parameter stays below −2.0 dB between 824 and 960 MHz, and the S11 parameter has a minimum value in the plot 502 of approximately −20 dB near 890 MHz.

The diagram 520 in FIG. 5B shows the real and imaginary components of the input impedance of the antenna system 400 in units of ohms over a frequency range of 0.5 GHz to 1.5 GHz. In particular, the plot 522 indicates the imaginary component, and the plot 524 indicates the real component. A point 526 marked on the plot 522 indicates that the imaginary component has a value of approximately 83 ohms at 824 MHz, and a point 528 marked on the plot 524 indicates the real component has a value of approximately 23 ohms at 824 MHz. A marker 530 in the diagram 520 indicates that the imaginary component has a value of approximately 10 ohms at 960 MHz, and the real component has a value of approximately 6 ohms at 960 MHz.

As shown in FIG. 5B, in the frequency range between 824 and 960 MHz, the real part of the input impedance ranges from approximately 6 to 90 ohms, and the imaginary part ranges from approximately −5 to 85 ohms. These impedance ranges can, in some cases, allow for easy impedance matching. Accordingly, the antenna system 400 has acceptable S11 and impedance for some mobile device applications.

Figure 6A:
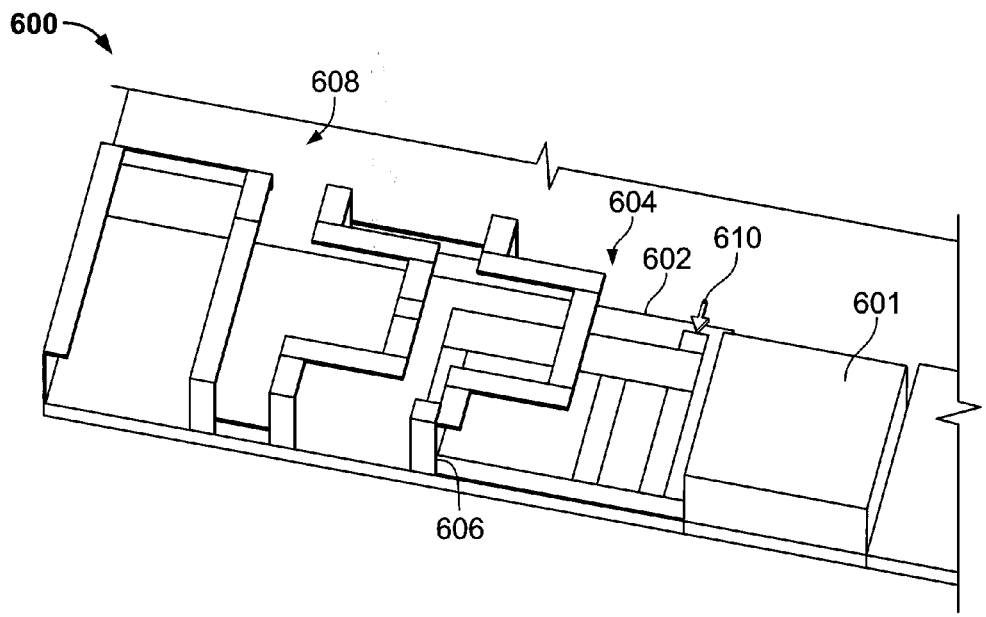
FIG. 6A is a schematic diagram of another example antenna system.

The diagram 540 in FIG. 5C shows a plot 542 of the 5-parameter Smith chart for the antenna system 400 shown in FIG. 4. The plot 542 is marked at two points 544 and 546, which indicate the complex value of the 5-parameter at lower and upper boundaries of the frequency range, i.e., at 824 MHz and 960 MHz, respectively. This plot further indicates the possibility of easy impedance matching FIG. 6A is a schematic diagram of another example antenna system 600. The radiator portion of the antenna system 600 includes an on-board multi-feed structure 604 and an on-carrier main antenna structure 608. The multi-feed structure 604 and the main antenna structure 608 are connected at a single connection point 606. In some cases, the antenna structure 600 can be used for wireless communications in a frequency range of 824 MHz to 960 MHz. In the example shown in FIG. 6A, the antenna structure 600 is supported on a substrate 602 and is adjacent to a USB port structure 601. The multi-feed structure 604 can be coupled to an input lead 610. The antenna system 600 can include additional or different features or components.

Figure 6B:
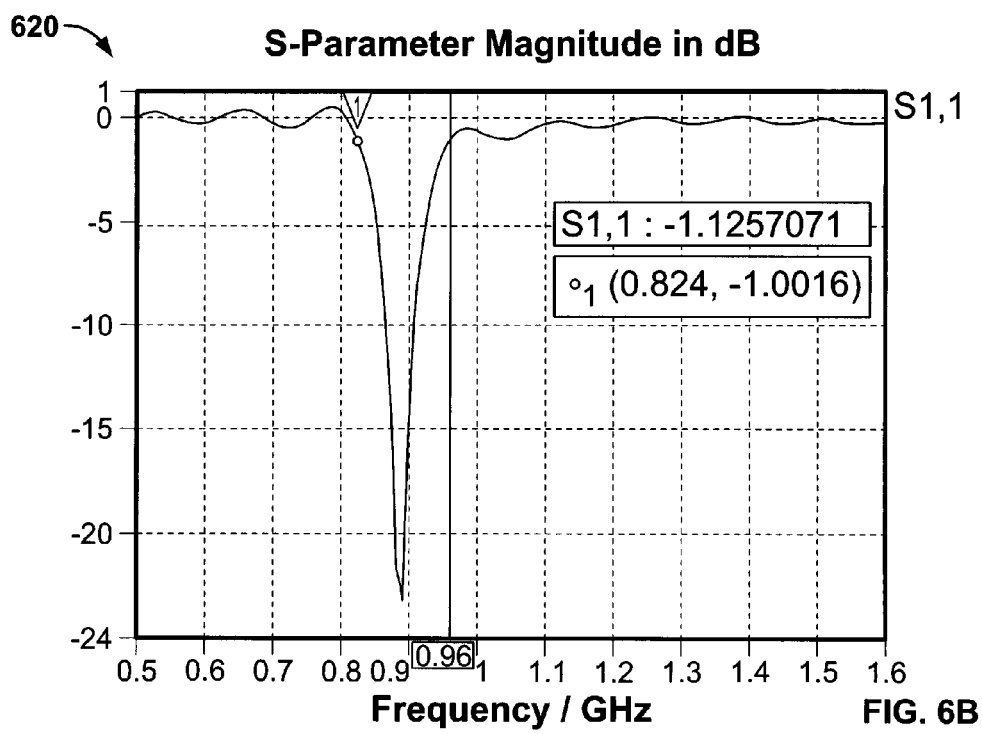
FIGS. 6B and 6C are diagrams showing simulated data for the example antenna system of FIG. 6A.
Figure 6C:
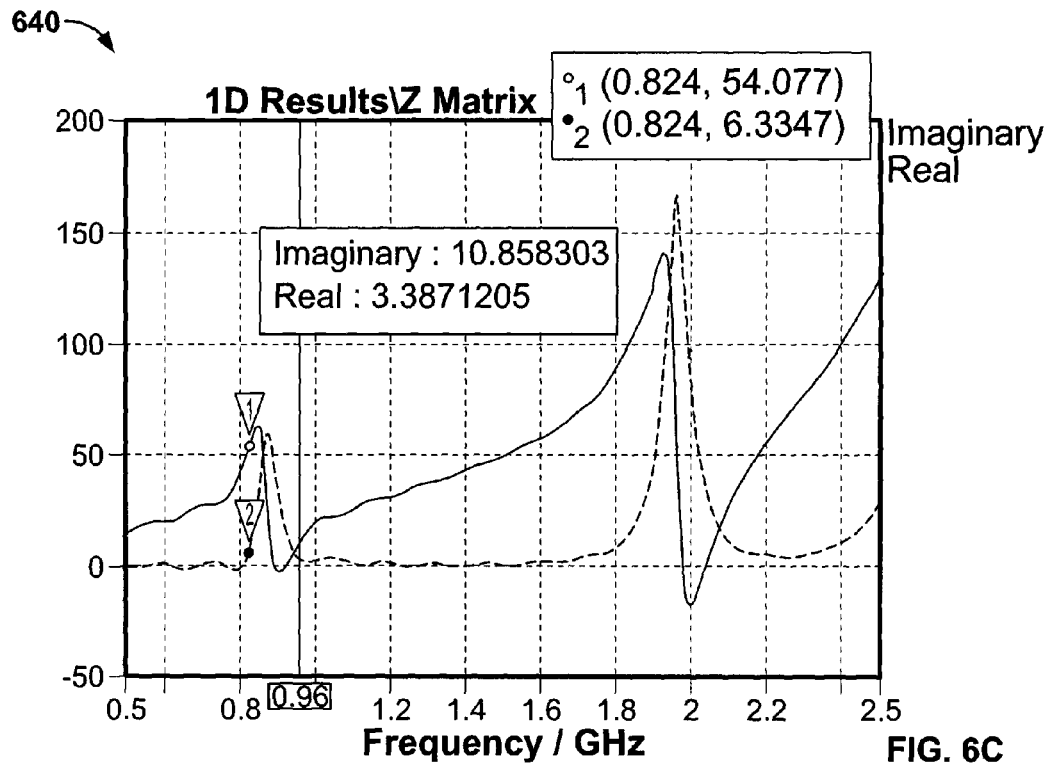

FIGS. 6B and 6C are diagrams 620 and 640 showing simulated data for the example antenna system 600 of FIG. 6A. The diagram 620 in FIG. 6B shows a plot of the S11 parameter magnitude in dB units over a frequency range from 0.5 GHz to 1.5 GHz. As shown in the diagram 620, the magnitude of the S11 parameter has a value of −1.0 dB at 824 MHz and −1.12 dB at 960 MHz. The diagram 620 shows that value of the S11 parameter stays below −1.0 dB between 824 and 960 MHz, and the S11 parameter has a minimum value in the diagram 620 of approximately −22 dB near 890 MHz.

The diagram 640 in FIG. 6C shows the real and imaginary components of the input impedance of the antenna system 600 in units of ohms over a frequency range of 0.5 GHz to 1.5 GHz. As shown in the diagram 640, the imaginary component of the input impedance has a value of 54 ohms at 824 MHz and a value of 11 ohms at 960 MHz, and the real component of the input impedance has a value of 6 ohms at 824 MHz and a value of 3 ohms at 960 MHz. Between 824 MHz and 960 MHz, the real component ranges from 3 to 60 ohms, and the imaginary component ranges from 0 to 60 ohms. As shown in FIG. 6C, the imaginary component of input impedance is primarily inductive (indicated by positive values of the imaginary component).

Figure 7:
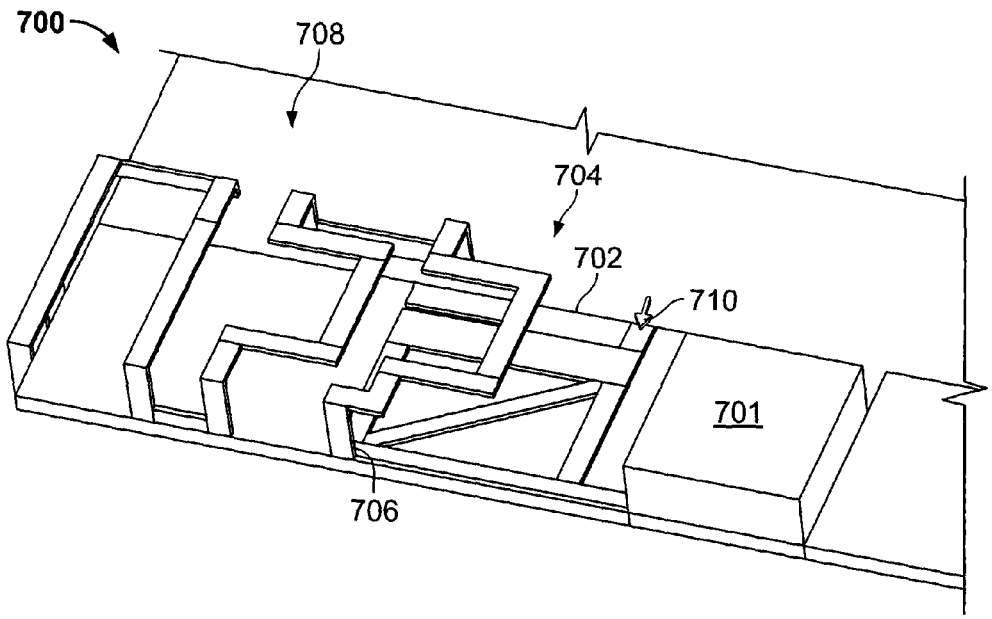
FIG. 7 is a schematic diagram of another example antenna system.

FIG. 7 is a schematic diagram of another example antenna system 700. The radiator portion of the antenna system 700 includes an on-board multi-feed structure 704 and an on-carrier main antenna structure 708. The multi-feed structure 704 and the main antenna structure 708 are connected at a single connection point 706. In some cases, the antenna structure 700 can be used for wireless communications in a frequency range of 824 MHz to 960 MHz. In the example shown in FIG. 7, the antenna structure 700 is supported on a substrate 702 and is adjacent to a USB port structure 701. The multi-feed structure 704 can be coupled to an input lead 710. The antenna system 700 can include additional or different features or components.

Figure 8A:
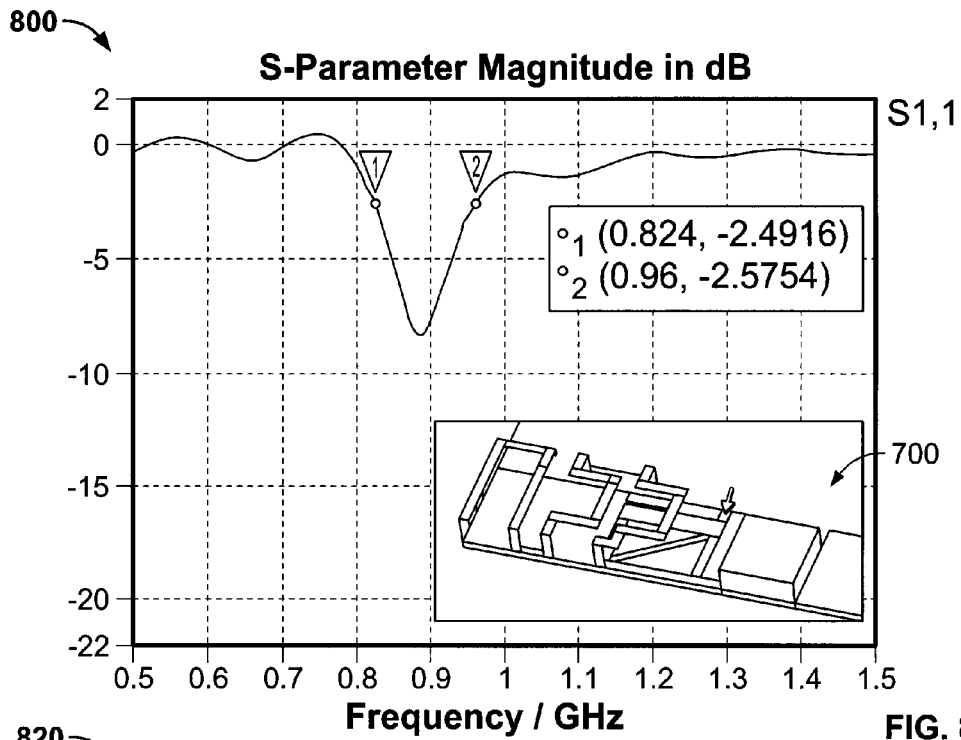
FIGS. 8A, 8B and 8C are diagrams showing simulated data for the example antenna system of FIG. 7.
Figure 8B:
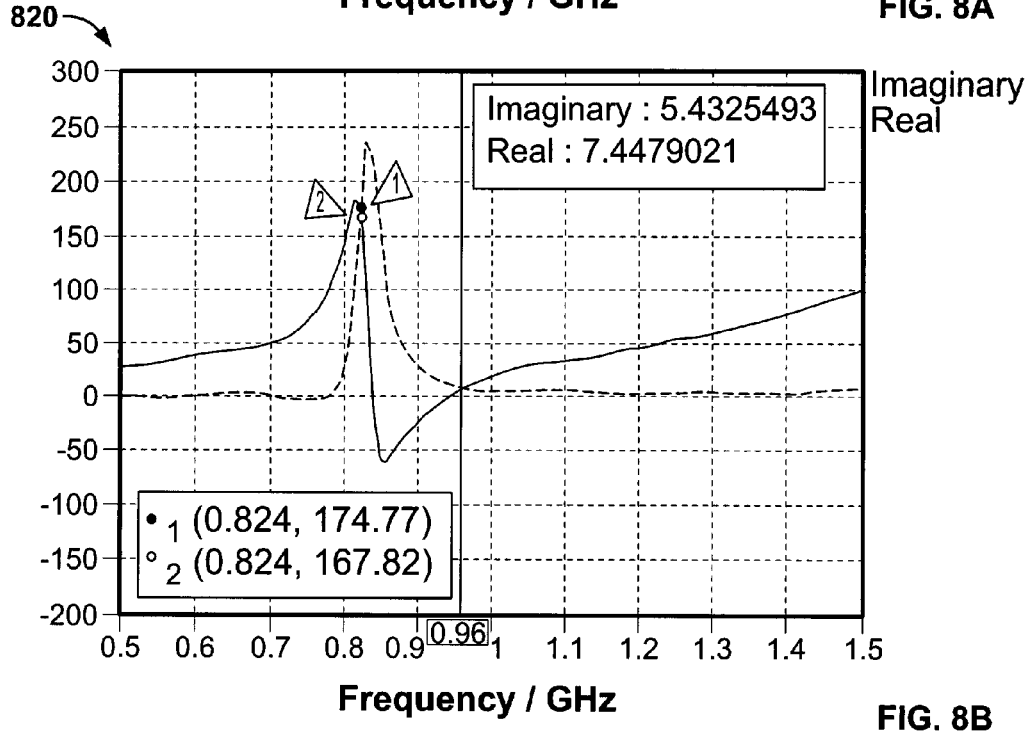
Figure 8C:
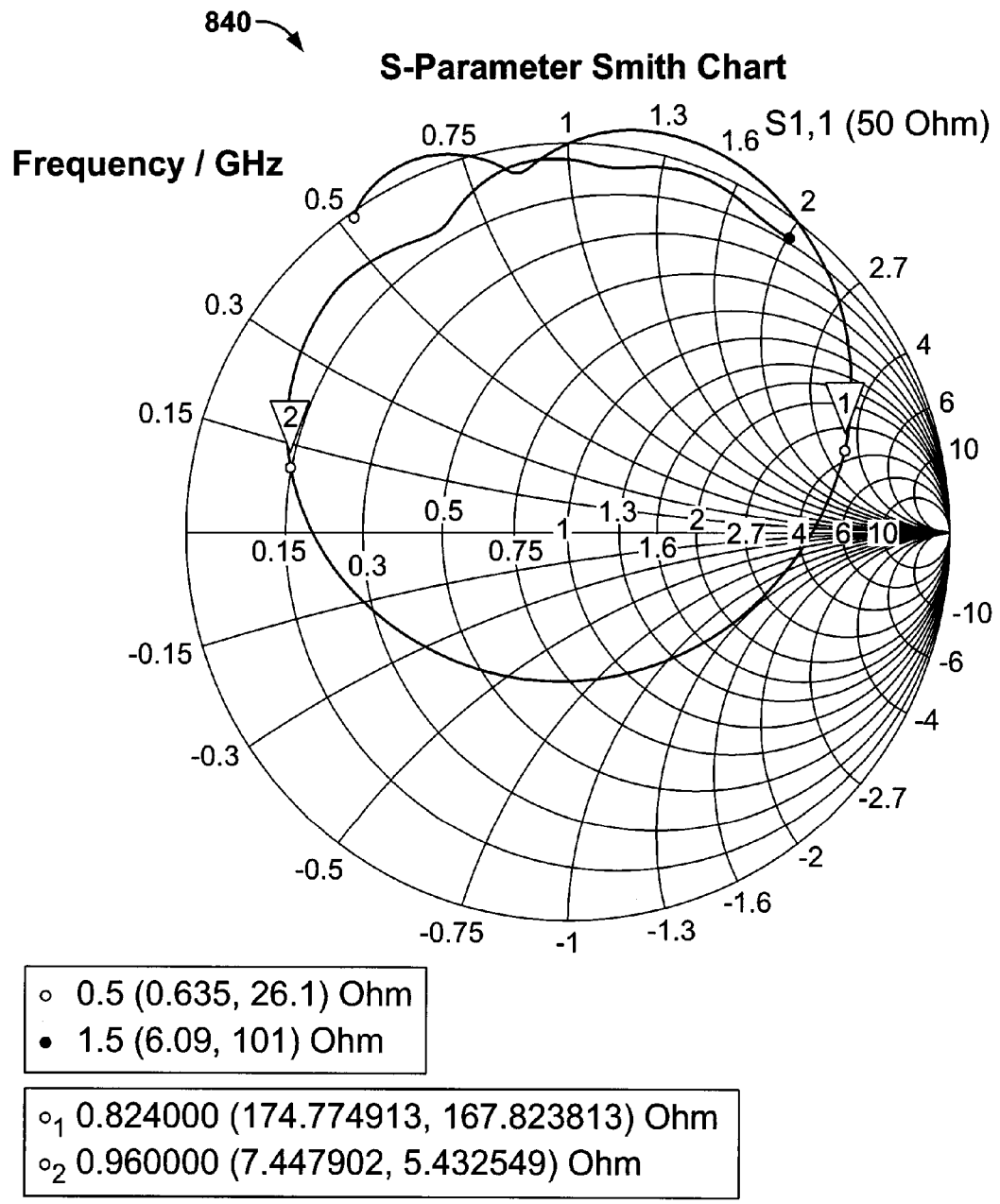

FIGS. 8A, 8B and 8C are diagrams showing simulated data for the example antenna system 700 of FIG. 7. The diagram 800 in FIG. 8A shows a plot of the S11 parameter magnitude in dB units over a frequency range from 0.5 GHz to 1.5 GHz. As shown in the diagram 800, the magnitude of the S11 parameter has a value of −2.5 dB at 824 MHz and −2.6 dB at 960 MHz. The diagram 800 shows that value of the S11 parameter stays below −2.5 dB between 824 and 960 MHz, and the S11 parameter has a minimum value in the diagram 800 of approximately −8 dB near 890 MHz.

The diagram 820 in FIG. 8B shows the real and imaginary components of the input impedance of the antenna system 700 in units of ohms over a frequency range of 0.5 GHz to 1.5 GHz. As shown in the diagram 820, the imaginary component of the input impedance has a value of 168 ohms at 824 MHz and a value of 5 ohms at 960 MHz, and the real component of the input impedance has a value of 175 ohms at 824 MHz and a value of 3 ohms at 960 MHz. Between 824 MHz and 960 MHz, the real component ranges from 7 to 240 ohms, and the imaginary component ranges from −60 to 168 ohms.

As demonstrated by the data in FIGS. 8A and 8B, the antenna system 700 has return loss characteristics (e.g., the S11 parameter is less than −2.5 dB over the frequency range of interest) better than some of the other antenna systems disclosed here. However, due to the larger variations in the impedance (real and imaginary components), the antenna system 700 may be more difficult to match than some of the other antenna systems disclosed here.

The diagram 840 in FIG. 8C shows a plot of the S-parameter Smith chart for the antenna system 700 shown in FIG. 7.

Figure 9A:
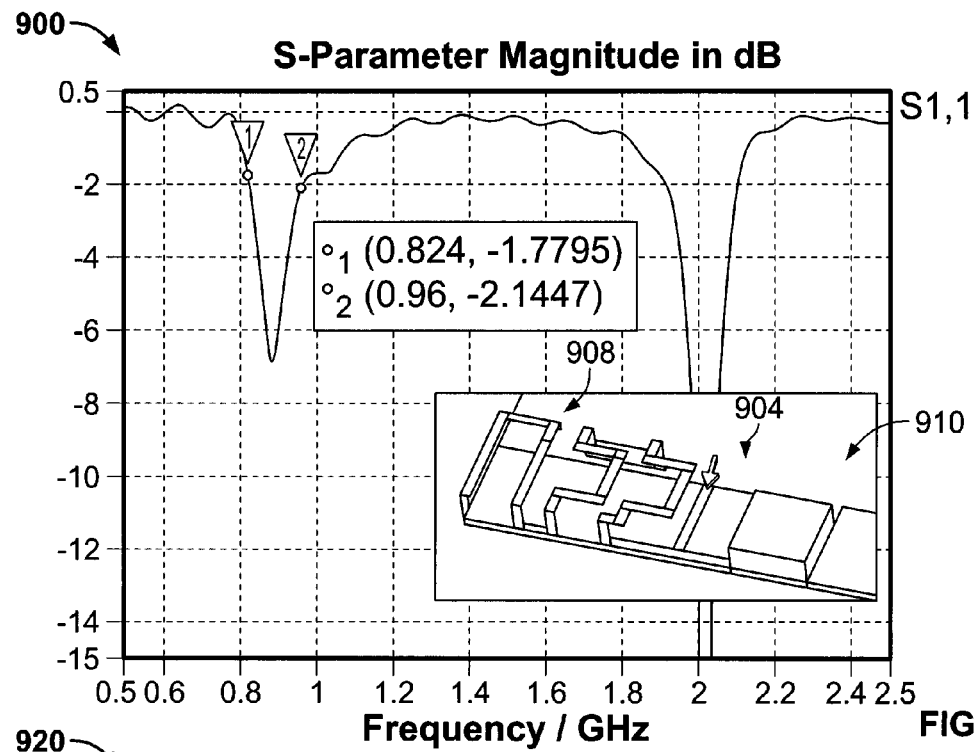
FIGS. 9A, 9B and 9C are diagrams showing simulated data for an example antenna system.
Figure 9B:
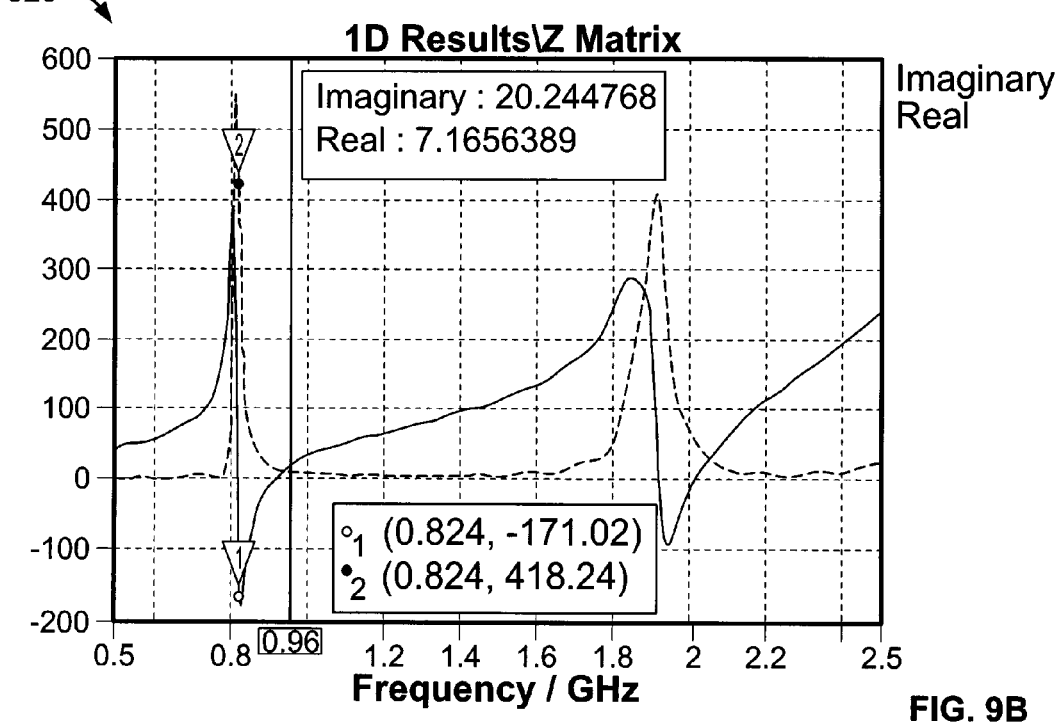
Figure 9C:
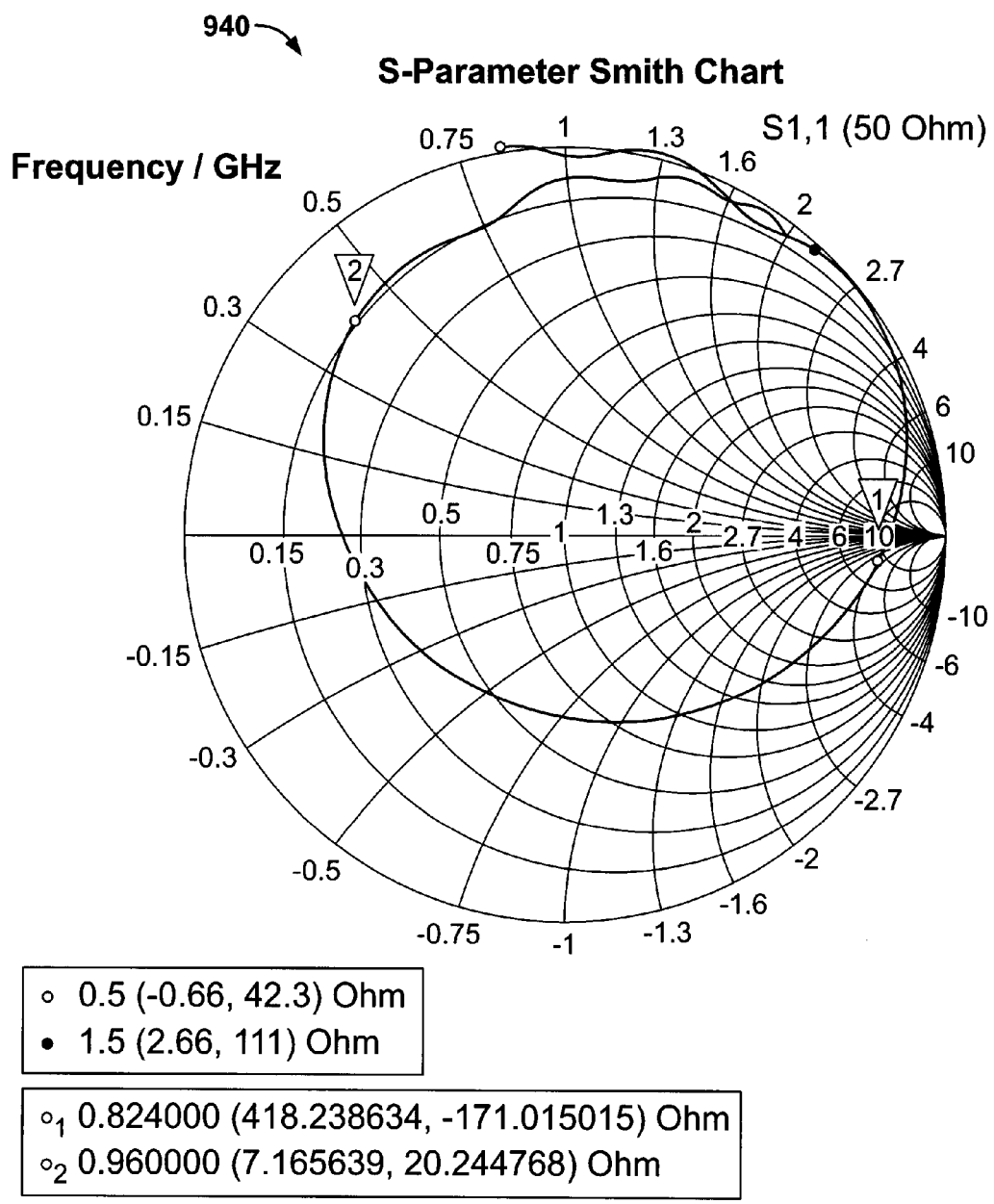

FIGS. 9A, 9B and 9C are diagrams showing simulated data for an example antenna system 910 shown in FIG. 9A. The radiator portion of the antenna system 910 includes an on-board single-feed structure 904 and an on-carrier main antenna structure 908. The single-feed structure 904 in the antenna system 910 includes a single feed line connecting an input lead to the main antenna structure. The main antenna structure 908 of the antenna system 910 is similar to the main antenna structure 608 for the antenna system 600 of FIG. 6A. Differences between the simulated data (in FIGS. 9A and 9B) for the antenna system 910 and the simulated data (in FIGS. 6A and 6B) for the antenna system 600 are attributable to substitution of the single-feed structure 904 for the multi-feed structure 604.

The diagram 900 in FIG. 9A shows a plot of the S11 parameter magnitude in dB units over a frequency range from 0.5 GHz to 1.5 GHz. As shown in the diagram 900, the magnitude of the S11 parameter has a value of −1.8 dB at 824 MHz and −2.1 dB at 960 MHz. The diagram 900 shows that value of the S11 parameter stays below −1.8 dB between 824 and 960 MHz, and the S11 parameter has a minimum value in the diagram 900 of approximately −7 dB near 890 MHz.

The diagram 920 in FIG. 9B shows the real and imaginary components of the input impedance of the antenna system 910 in units of ohms, over a frequency range of 0.5 GHz to 1.5 GHz. As shown in the diagram 920, the imaginary component of the input impedance has a value of −171 ohms at 824 MHz and a value of 20 ohms at 960 MHz, and the real component of the input impedance has a value of 418 ohms at 824 MHz and a value of 7 ohms at 960 MHz. Between 824 MHz and 960 MHz, the real component ranges from 7 to 550 ohms, and the imaginary component ranges from −175 to 20 ohms.

The diagram 940 in FIG. 9C shows a plot of the S-parameter Smith chart for the antenna system 910 shown in FIG. 9A. The diagram 940 shows that the single-feed antenna system 910 is more difficult to match, for example, when compared to the multi-feed antenna system 600 of FIG. 6A.

Comparing the S11 magnitude in the diagram 900 of FIG. 9A (for the antenna system 910 that has a single-feed structure 904) with the S11 magnitude in the diagram 620 of FIG. 6B (for the antenna system 600 that has a multi-feed structure 604), the single-feed structure 904 could potentially provide better return loss between 824 MHz and 960 MHz. However, comparing the input impedance in the diagram 920 (for the antenna system 910 that has a single-feed structure 904) with the input impedance in the diagram 640 of FIG. 6C (for the antenna system 600 that has a multi-feed structure 604), the multi-feed structure 604 could potentially provide better impedance matching between 824 MHz and 960 MHz (as indicated by the smaller variations in the input impedance for the antenna system 600).

Further, comparing the S11 magnitude in the diagram 900 of FIG. 9A (for the antenna system 910 that has a single-feed structure 904) with the S11 magnitude in the diagram 800 of FIG. 8A (for the antenna system 700 that has a multi-feed structure 704), the multi-feed structure 704 could potentially provide better return loss between 824 MHz and 960 MHz. This comparison indicates the added flexibility that can be introduced by the multi-feed structure that could potentially be tuned or optimized to provide either better impedance matching between 824 MHz and 960 MHz (as indicated by the smaller variations in the input impedance for the antenna system 600) or a better (pre-matching) return loss (as indicated in FIG. 8A).

Figure 10A:
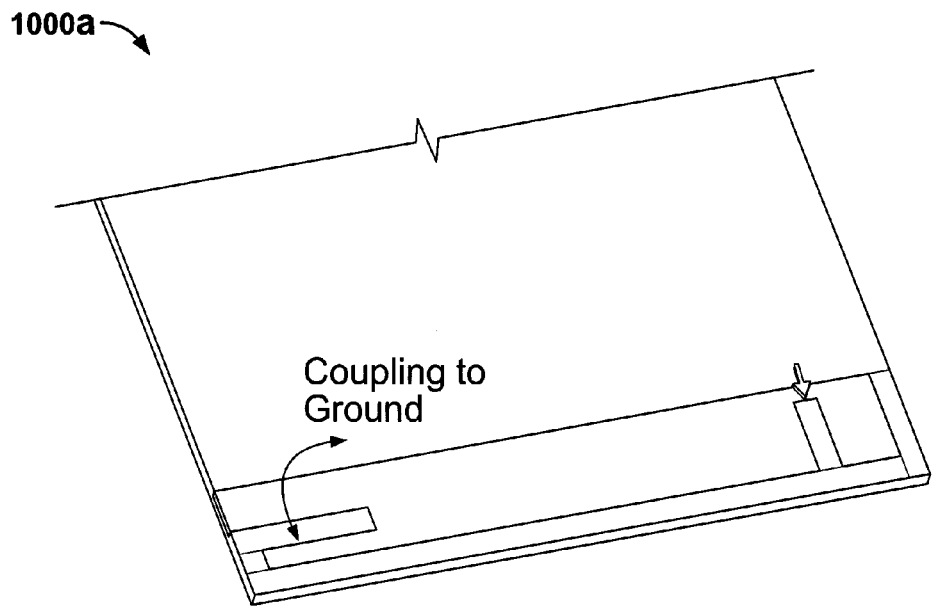
FIGS. 10A, 10B, 10C, 10D 10E, and 10F are schematic diagrams showing multiple example antenna systems.
Figure 10B:
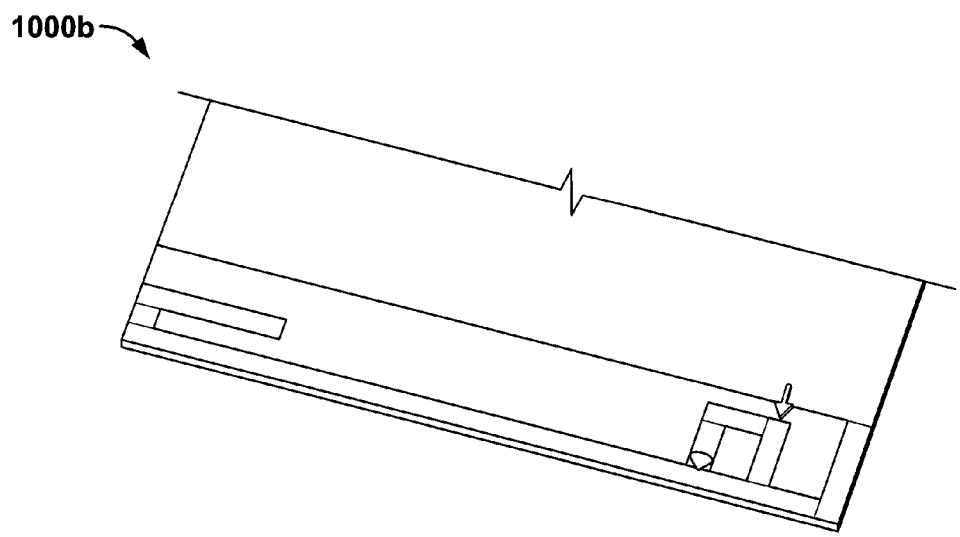

FIGS. 10A, 10B, 10C, 10D, 10E, and 10F are schematic diagrams showing multiple example antenna systems. FIG. 10A shows a planar antenna 1000a that includes coupling to ground. The antenna 1000a has a single-feed structure. FIG. 10B shows another planar antenna 1000b that includes coupling to ground. The antenna 1000b has a multi-feed structure (two feeds).

Figure 10C:
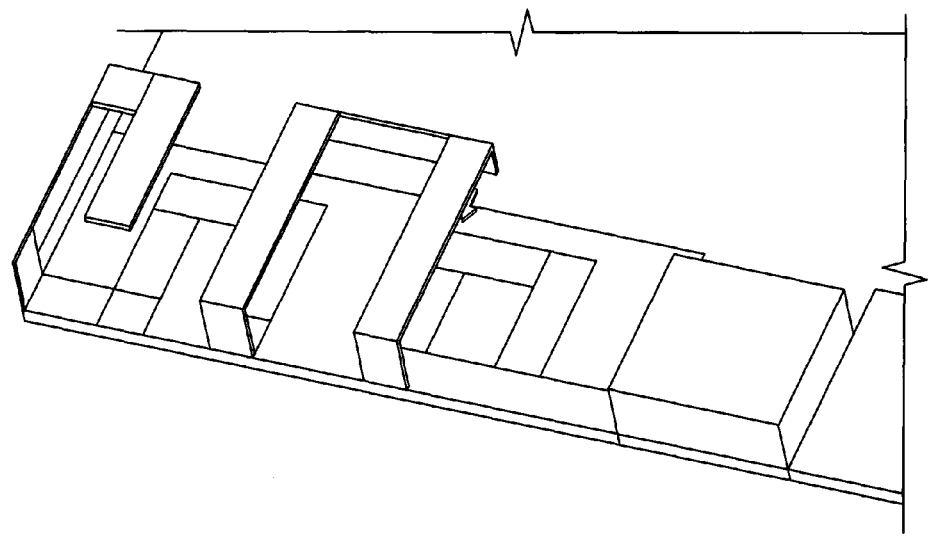
Figure 10D:
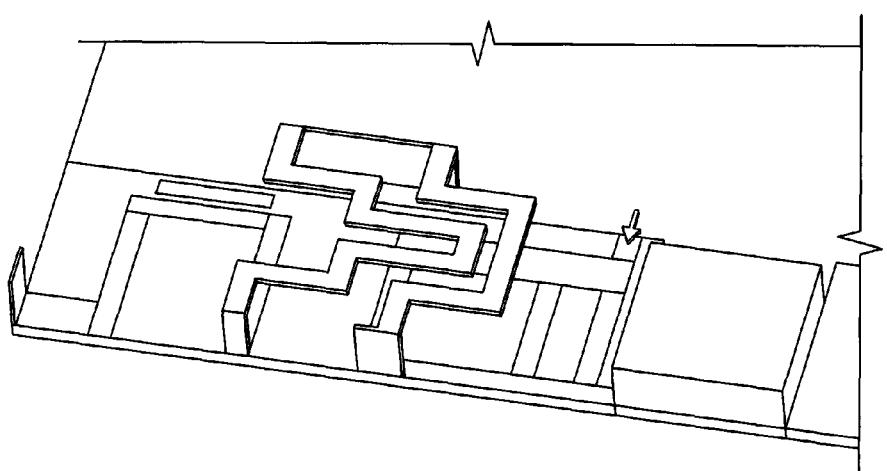

FIG. 10C shows an antenna 1000c with a multi-feed structure (two feeds) and a conductor folded in three dimensions. FIG. 10D shows an antenna 1000d with a multi-feed structure (three feeds) and a conductor folded in three dimensions. The example antennae 1000c and 1000d each include a conductor that is connected to the ground of the USB port structure. The folded conductors in the example antennae 1000c and 1000d each include a section that is capacitively coupled to ground.

Figure 10E:
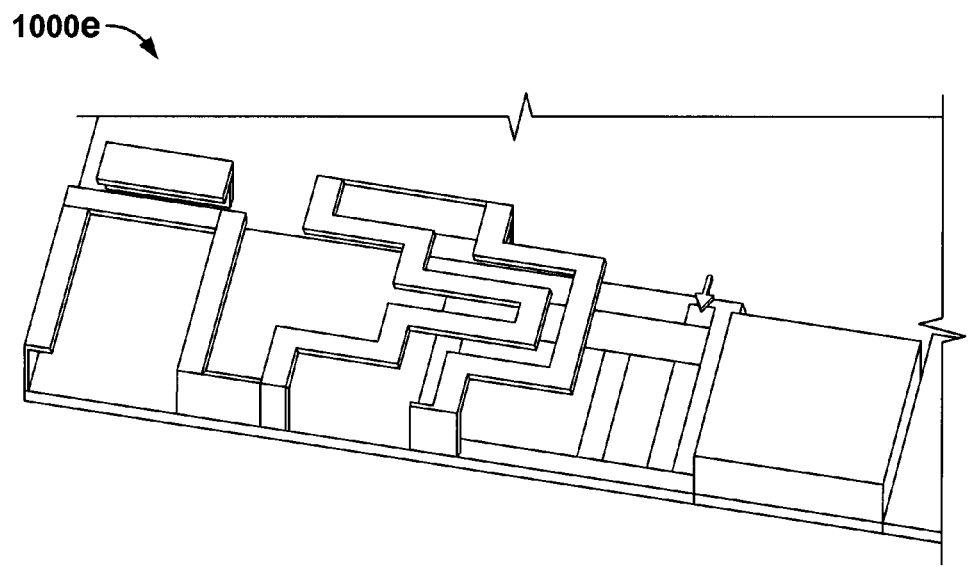
Figure 10F:
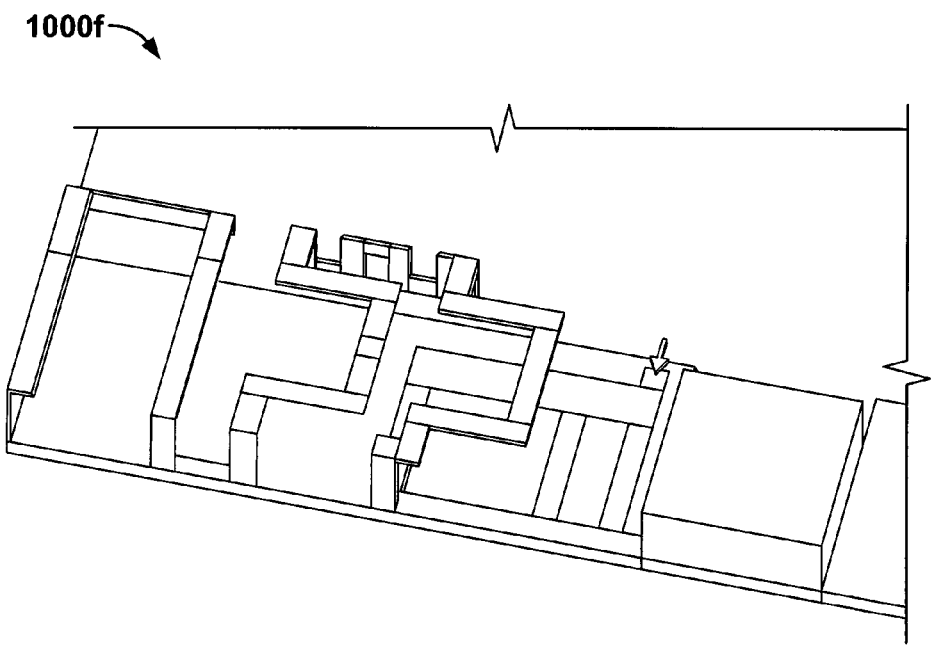

FIG. 10E shows an antenna 1000e with a multi-feed structure (three feeds) and a conductor folded in three dimensions. The folded conductor portion of the antenna 1000e includes two sections that are capacitively coupled to ground where one of the sections is capacitively coupled to a protruded ground section. FIG. 10F shows an antenna 1000f with a multi-feed structure (three feeds) and a conductor folded in three dimensions. The folded conductor portion of the antenna 1000f includes three sections that are capacitively coupled to ground.

Figure 11C:
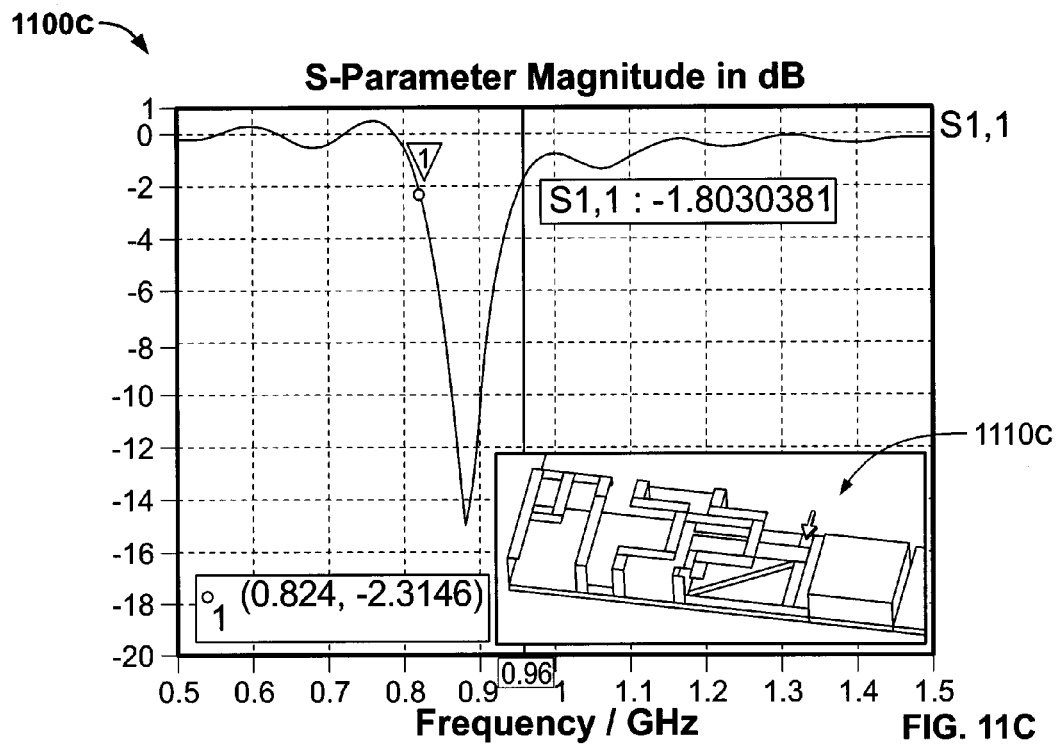

FIGS. 11A, 11B, 11C, 11D, and 11E are diagrams showing simulated data for multiple example antenna systems. The diagram 1100a in FIG. 11A shows the S11 parameter magnitude for an antenna structure 1110a that includes capacitance in some of the feed lines.

The diagram 1100b in FIG. 11B shows the S11 parameter magnitude for an antenna structure 1110b that includes capacitance to ground on the main antenna structure. The diagram 1100c in FIG. 11C shows the S11 parameter magnitude for an antenna structure 1110c that includes a triple-feed structure with an angled feed. The capacitance to ground and the triple-feed structure can be used to improve the matching and bandwidth performance.

Figure 11D:
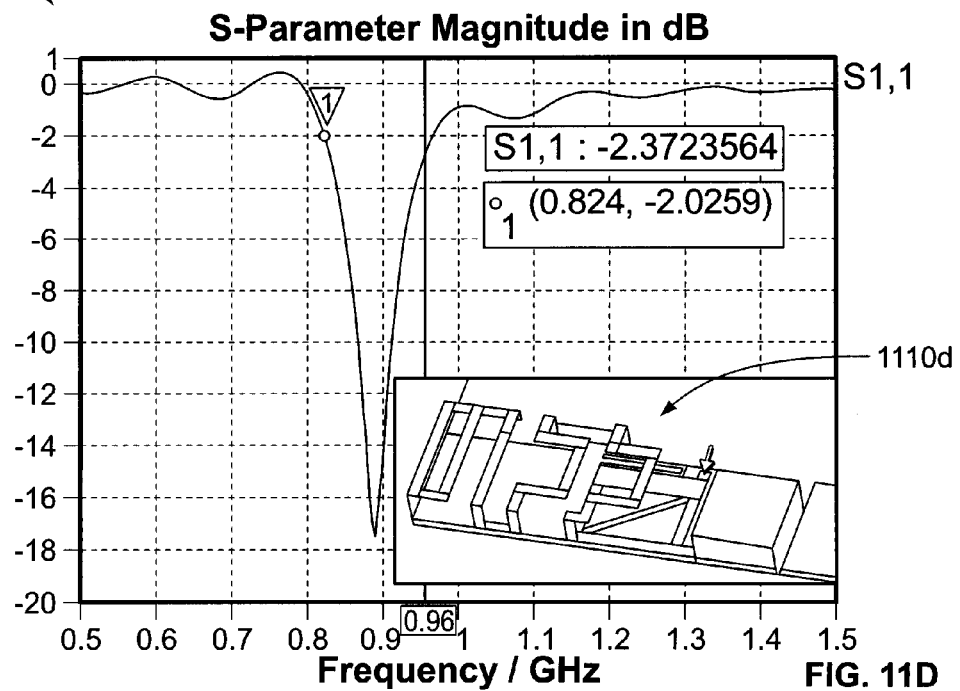
Figure 11E:
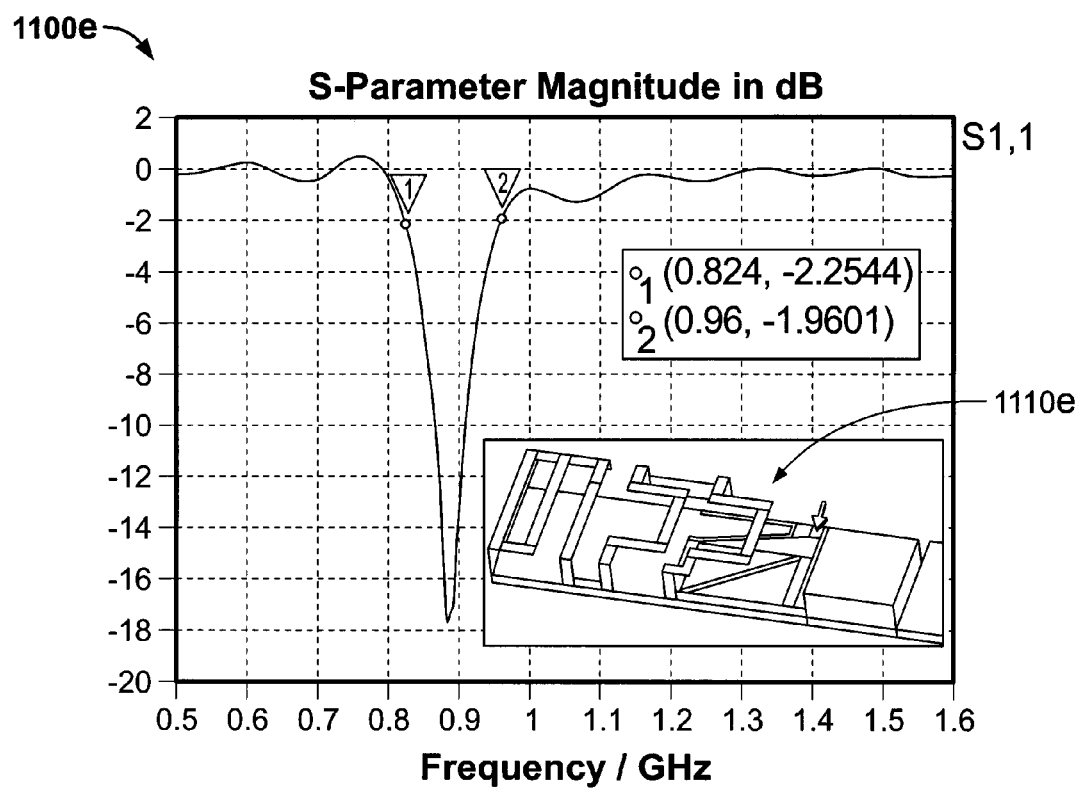

The diagram 1100d in FIG. 11D shows the S11 parameter magnitude for an antenna structure 1110d that includes an inductive and capacitive parasitic on one of the feed lines. The diagram 1100e in FIG. 11E shows the S11 parameter magnitude for an antenna structure 1110e that includes a tapered feed line. The parasitic and the tapered feed line can help to improve the matching and bandwidth performance of the antenna.

Figure 12A:
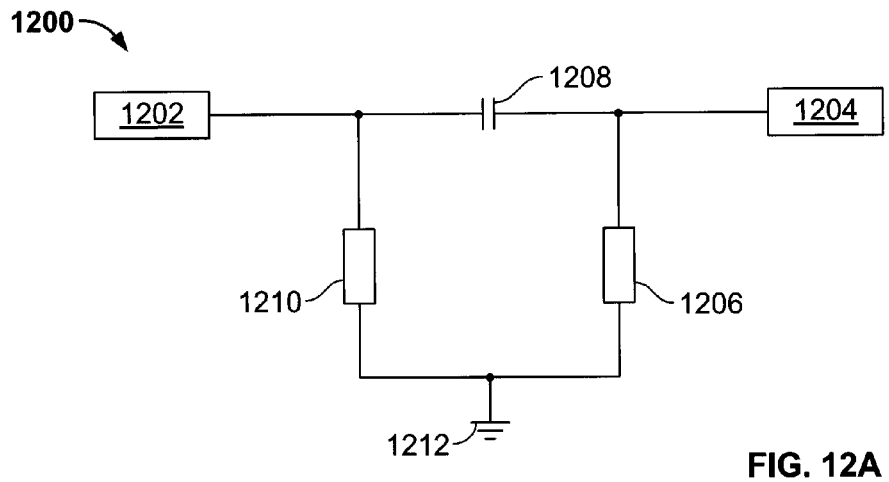
FIG. 12A is a schematic diagram showing an example matching circuit for an antenna system.
Figure 12B:
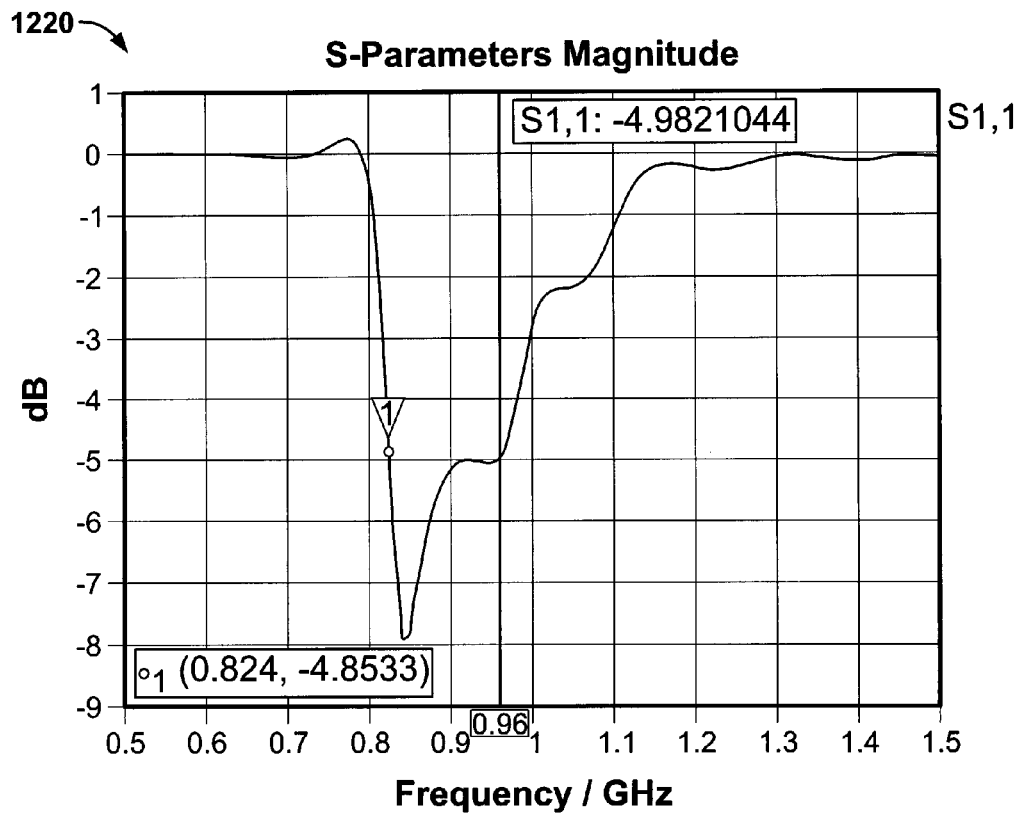
FIG. 12B is a diagram showing simulated data for an example antenna system.

FIG. 12A is a schematic diagram showing an example matching circuit 1200 for an antenna system; FIG. 12B is a diagram 1220 showing simulated data for an example antenna system with a matching circuit. The diagram of the matching circuit 1200 shows an antenna 1204 and an input lead 1202. Between the input lead 1202 and the antenna 1204 is a circuit that includes a capacitor 1208, an inductor 1206 and a second inductor 1210. The circuit is connected to ground 1212 between inductors 1206 and 1210.

The matching circuit 1200 was simulated with the example antenna system 400 of FIG. 4. The simulated data are shown in the diagram 1220 in FIG. 12B. The diagram 1220 shows the S11 parameter magnitude in dB units over a frequency range of 0.5 GHz to 1.5 GHz. As shown in the diagram 1220, the magnitude of the S11 parameter has a value of −4.9 dB at 824 MHz and −5.0 dB at 960 MHz. The diagram 1220 shows that value of the S11 parameter stays below −4.8 dB between 824 and 960 MHz, and the S11 parameter has a minimum value in the diagram 1220 of approximately −8 dB near 850 MHz. As such, the simulations indicate that the matching circuit 1200 can lower the return loss of the antenna system 400.

Figure 13A:
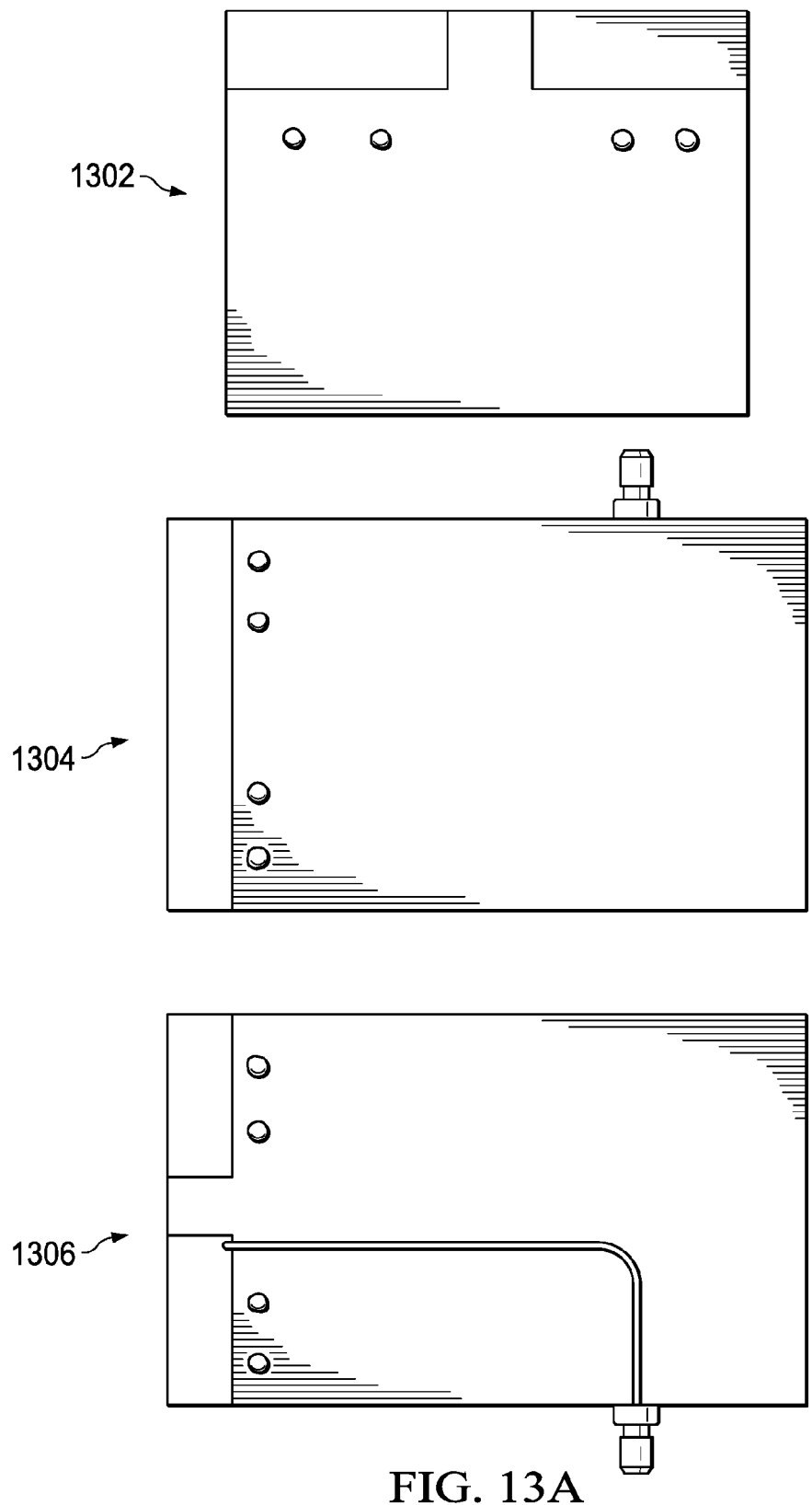
FIG. 13A shows photographs of an example mobile device component that includes an antenna.
Figure 13B:
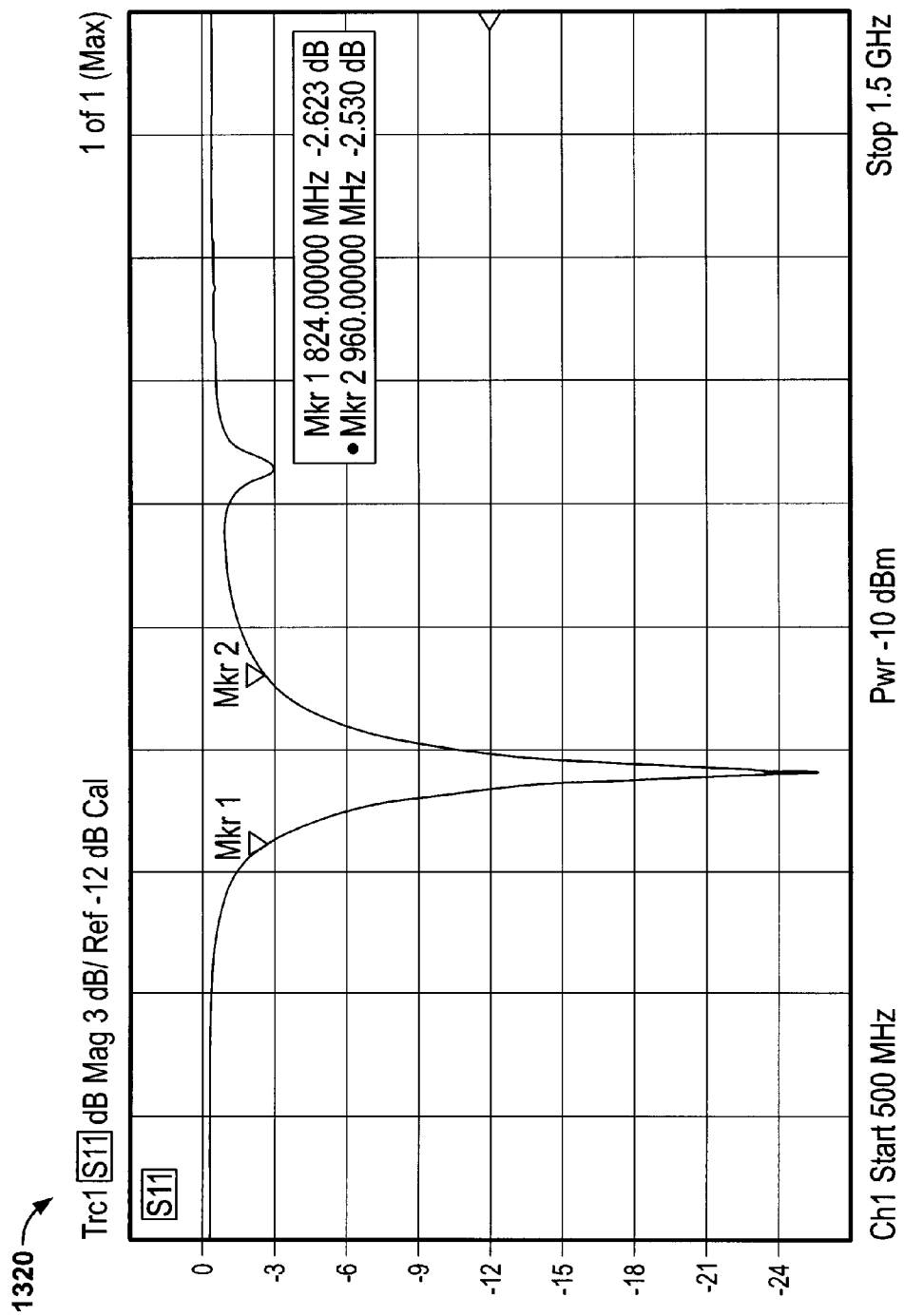
FIG. 13B is a diagram showing measured data for the mobile device component of FIG. 13A.

FIG. 13A shows photographs 1302, 1304, and 1306 of an example prototype mobile device component that includes an antenna without a matching circuit. FIG. 13B is a diagram 1320 showing measured data for the mobile device component of FIG. 13A without matching.

Figure 14A:
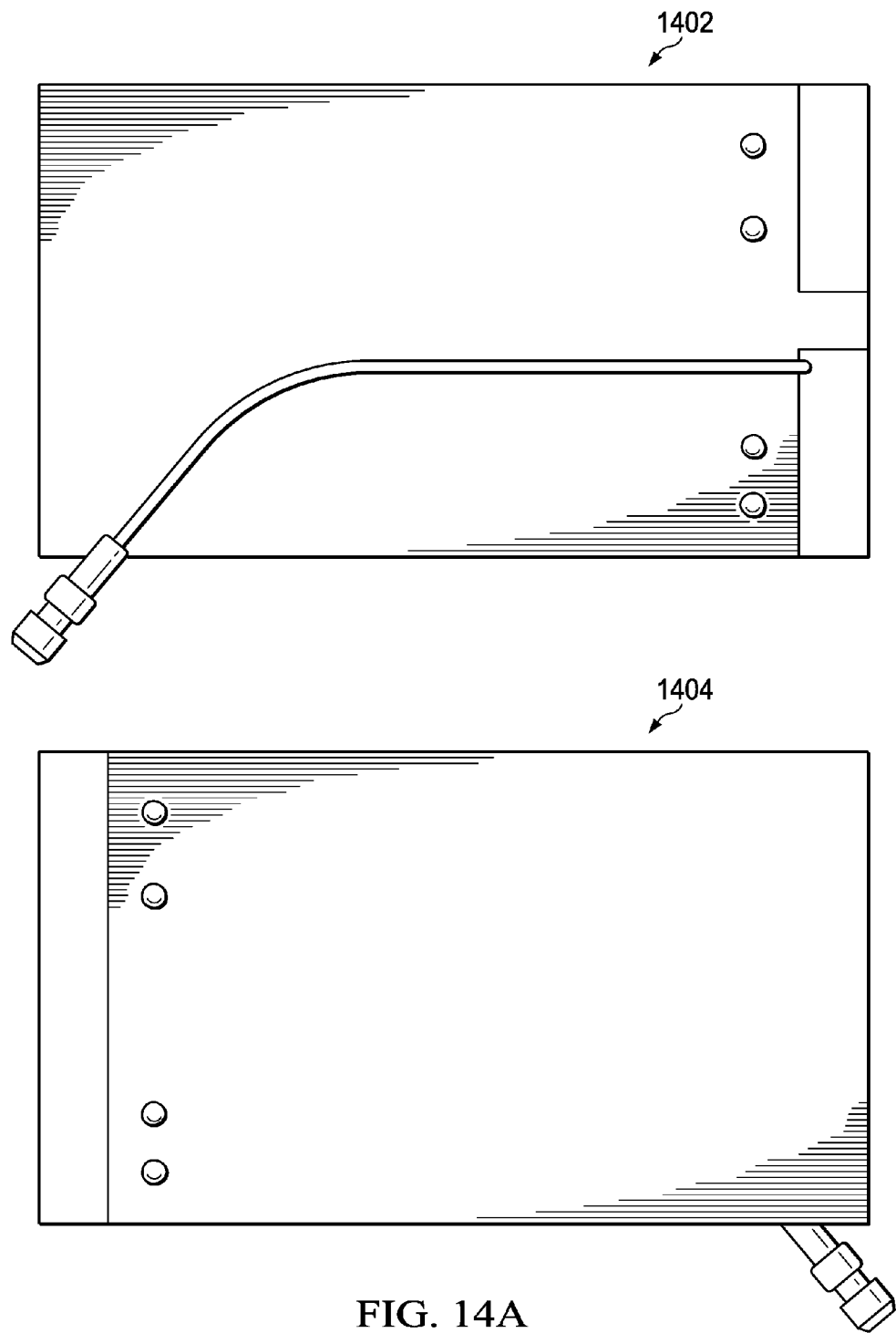
FIG. 14A shows photographs of an example mobile device component that includes an antenna.
Figure 14B:
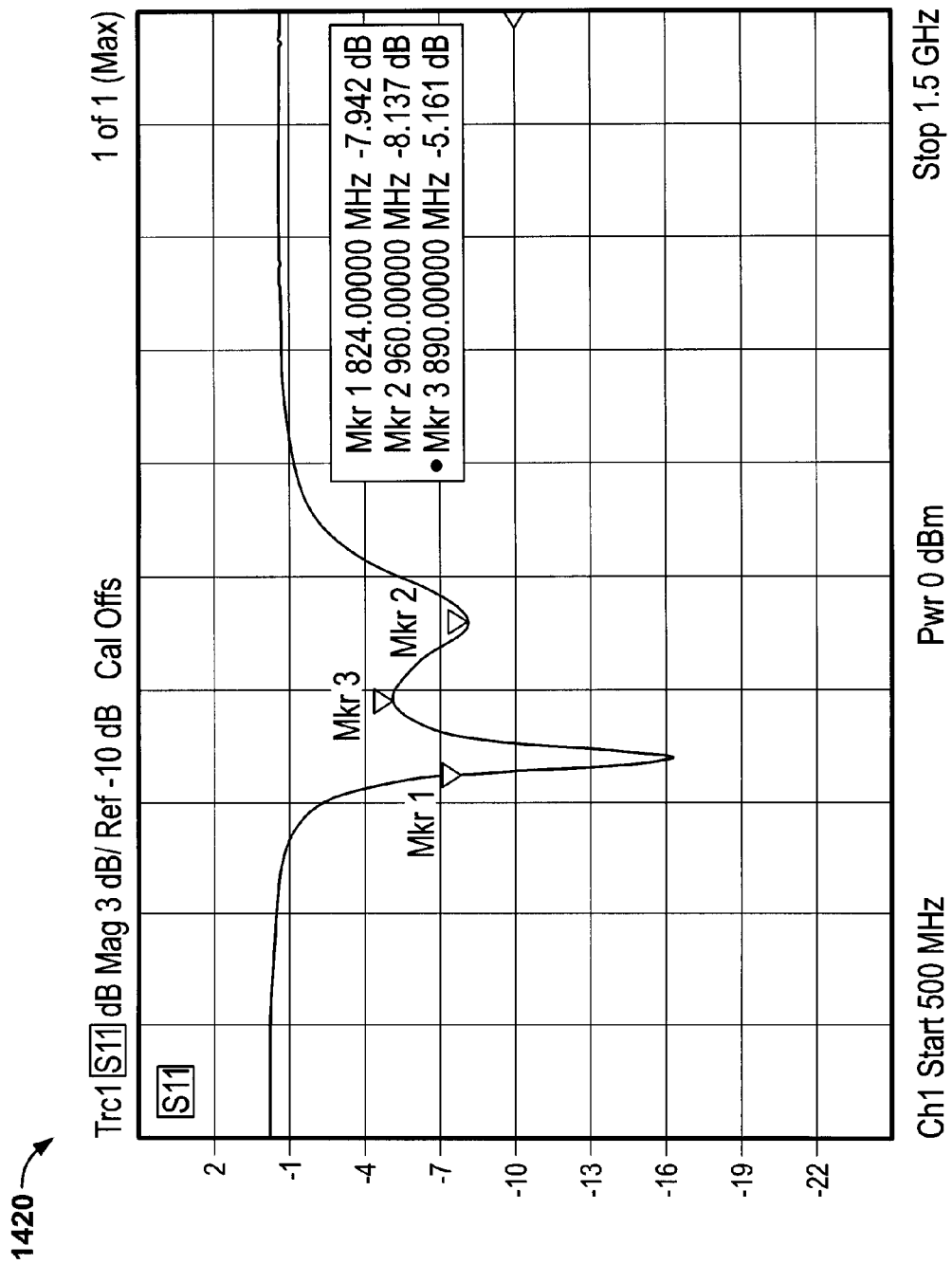
FIG. 14B is a diagram showing measured data for the mobile device component of FIG. 14A.

FIG. 14A shows photographs 1402, 1404 of an example mobile device component that includes an antenna with a matching circuit. FIG. 14B is a diagram 1420 showing measured data for the mobile device component of FIG. 14A with matching. The prototyped match is slightly different from the simulated one, which is due to the non-ideal matching components and hand prototyping. The diagram 1420 of FIG. 14B, when compared to the diagram 1320 of FIG. 13B, shows improved performance of the prototype with use of the matching circuit.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, an antenna system for a mobile device includes multiple feeds, a connector, and a main antenna structure. The feeds reside on a substantially planar substrate. Each of the feeds has a first end connected to at least one of the other feeds and a second end connected to a connector. The main antenna structure extends from the planar substrate and is connected to the connector.

Implementations of these and other aspects can include one or more of the following features. The main antenna structure abuts a carrier structure on the planar substrate. The main antenna structure includes a conductive strip extending along a path about the carrier structure. The path includes a tortuous path. The path includes multiple sections and substantially right angles between adjacent sections. At least two of the sections are capacitively coupled to a ground. The main antenna structure includes a branching structure extending between two of the sections. The substantially planar substrate defines a length direction and a width direction, and the main antenna structure extends from the substantially planar substrate in a height direction.

Additionally or alternatively, implementations of these and other aspects can include one or more of the following features. The feeds include a first feed, a second feed, and a third feed. The first feed includes a substantially planar structure having a width that is tapered along a length of the planar structure. The first feed includes a substantially planar structure having a width that is stepped along a length of the planar structure. The antenna system includes a parasitic on the substantially planar substrate. The parasitic is inductively and capacitively coupled to the first feed. The plurality of feeds include a plurality of substantially planar structures. Each of the substantially planar structures has a different length than the other substantially planar structures.

Additionally or alternatively, implementations of these and other aspects can include one or more of the following features. The plurality of feeds, the connector, and the main antenna structure define a three-dimensional volume of the antenna system. A largest dimension of the three-dimensional volume is less than or equal to 27 millimeters. A smallest dimension of the three-dimensional volume is less than or equal to 4 millimeters.

Additionally or alternatively, implementations of these and other aspects can include one or more of the following features. The antenna system is included in a mobile device. The mobile device includes a wired port structure. The connector is connected to a ground of the wired port structure. The wired port structure is a Universal Serial Bus (USB) port. The antenna is operable to communicate signals ranging from 824 MHz to 960 MHz. The mobile device includes a transceiver connected to the input lead.

In some aspects, operating a mobile device includes wirelessly communicating information by an antenna of the mobile device, and transferring the information between the antenna and data processing apparatus of the mobile device. Wirelessly communicating can include transmitting wireless signals having a frequency in a range from 824 MHz to 960 MHz or in a different range; wirelessly communicating can include receiving wireless signals having a frequency in the range from 824 MHz to 960 MHz or in a different range. Transferring the information can include transferring the information by a signal processor, a transceiver, a receiver, a transmitter, a data bus, or any suitable combination of these and other features of the mobile device. Transferring the information can include sending the information from the antenna to the data processing apparatus, sending the information to the antenna from the data processing apparatus, or any suitable combination.

Thus, particular implementations of the subject matter have been described. Other implementations are within the scope of the following claims. In some cases, the actions recited in the claims can be performed in another order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An antenna system for a mobile device, the antenna system comprising:

a plurality of feeds on a substantially planar surface of a substrate, each of the plurality of feeds having a first end that is connected to at least one of the other feeds and a second end that is connected to a same connector, wherein the plurality of the feeds include a first feed and a second feed;
a parasitic on the substantially planar surface, wherein the parasitic is a conductor having a first section capacitively coupled to the first feed; and
a main antenna structure extending from the substantially planar surface and connected to the connector.

2. The antenna system of claim 1, wherein the main antenna structure abuts a carrier structure on the substantially planar surface.

3. The antenna system of claim 2, wherein the main antenna structure includes a conductive strip extending along a tortuous path about the carrier structure.

4. The antenna system of claim 3, wherein the tortuous path includes multiple sections and substantially right angles between adjacent sections.

5. The antenna system of claim 4, wherein at least two of the sections are capacitively coupled to a ground.

6. The antenna system of claim 4, wherein the main antenna structure includes a branching structure extending between two of the sections.

7. The antenna system of claim 1, wherein the substantially planar surface defines a length direction and a width direction, and the main antenna structure extends from the substantially planar surface in a height direction.

8. The antenna system of claim 1, wherein the first feed includes a substantially planar structure having a width that is tapered along a length of the planar structure.

9. The antenna system of claim 1, wherein the first feed includes a substantially planar structure having a width that is stepped along a length of the planar structure.

10. The antenna system of claim 9, wherein the first section of the parasitic has a stepped structure geometrically matching the stepped structure of the first feed.

11. The antenna system of claim 1, wherein the plurality of feeds include a plurality of substantially planar structures, and each of the substantially planar structures has a different length than the other substantially planar structures.

12. The antenna system of claim 1, wherein the plurality of feeds, the connector, and the main antenna structure define a three-dimensional volume of the antenna system, a largest dimension of the three-dimensional volume is less than or equal to 27 millimeters, and a smallest dimension of the three-dimensional volume is less than or equal to 4 millimeters.

13. The antenna system of claim 1, wherein the plurality of feeds include a third feed.

14. A mobile device comprising an antenna comprising:
a plurality of feeds on a substantially planar surface of a substrate, each of the plurality of feeds having a first end that is connected to at least one of the other feeds and a second end that is connected to a same connector, wherein the plurality of the feeds include a first feed and a second feed;
a parasitic on the substantially planar surface, wherein the parasitic is a conductor having a first section capacitively coupled to the first feed; and
a main antenna structure extending from the substantially planar surface and connected to the connector.

15. The mobile device of claim 14, further comprising a wired port structure of the mobile device, wherein the connector is connected to a ground of the wired port structure.

16. The mobile device of claim 15, wherein the wired port structure comprises a Universal Serial Bus (USB) port.

17. The mobile device of claim 14, wherein the antenna is operable to communicate signals ranging from 824 MHz to 960 MHz.

18. The mobile device of claim 14, further comprising a transceiver connected to at least one of the feeds.

19. The mobile device of claim 14, wherein the main antenna structure abuts a carrier structure on the substrate, and the main antenna structure includes a conductive strip about the carrier structure.

20. The mobile device of claim 19, wherein a path defined by the conductive strip includes multiple sections, and at least two of the sections are capacitively coupled to a ground.

21. The mobile device of claim 19, wherein a path defined by conductive strip includes multiple sections, and the main antenna structure includes a branching structure extending between two of the sections.

22. The mobile device of claim 14, wherein the first feed includes a substantially planar structure having a width that is tapered along a length of the planar structure.

23. The mobile device of claim 14, wherein the first feed includes a substantially planar structure having a width that is stepped along a length of the planar structure.

24. The mobile device of claim 14, wherein the plurality of feeds include a third feed.

25. A method of operating a mobile device comprising:
wirelessly communicating information by an antenna of the mobile device comprising:
a plurality of feeds on a substantially planar surface of a substrate, each of the plurality of feeds having a first end that is connected to at least one of the other feeds and a second end that is connected to a same connector, wherein the plurality of the feeds include a first feed and a second feed;
a parasitic on the substantially planar surface, wherein the parasitic is a conductor having a first section capacitively coupled to the first feed; and
a main antenna structure extending from the substantially planar surface and connected to the connector; and
transferring the information between the antenna and data processing apparatus of the mobile device.

26. The method of claim 25, wherein wirelessly communicating comprises transmitting wireless signals having a frequency in a range from 824 MHz to 960 MHz.

27. The method of claim 25, wherein wirelessly communicating comprises receiving wireless signals having a frequency in a range from 824 MHz to 960 MHz.

* * * * *